United States Patent
Naito et al.

(10) Patent No.: US 8,351,074 B2
(45) Date of Patent: Jan. 8, 2013

(54) COLOR PRINT CONTROL METHOD AND APPARATUS FOR MANAGING COLOR PROFILE USED FOR COLOR MATCHING IN ASSOCIATION WITH A VIRTUAL PRINTER AND PAPER

(75) Inventors: Kikuo Naito, Kawasaki (JP); Kensuke Nozaki, Kawasaki (JP); Hayato Kubo, Chiba (JP); Natsuki Uemura, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 996 days.

(21) Appl. No.: 11/856,125

(22) Filed: Sep. 17, 2007

(65) Prior Publication Data

US 2008/0074686 A1 Mar. 27, 2008

(30) Foreign Application Priority Data

Sep. 25, 2006 (JP) ................................ 2006-259496

(51) Int. Cl.
*G06K 1/00* (2006.01)
*G06K 9/00* (2006.01)
*G03G 15/01* (2006.01)

(52) U.S. Cl. ...... 358/1.9; 358/1.13; 358/1.14; 358/1.15; 358/296; 358/504; 358/403; 358/404; 382/162; 382/164; 382/167; 399/15; 399/28; 399/39; 399/54; 399/178

(58) Field of Classification Search .................. 358/1.9, 358/1.15, 1.11–1.14, 1.16, 1.18, 1.6, 2.1, 358/3.1, 403–406, 426.01, 426.05, 426.08, 358/426.11; 382/162, 164, 166, 167
See application file for complete search history.

(56) References Cited

U.S. PATENT DOCUMENTS

| 5,859,711 | A  | * | 1/1999  | Barry et al.      | 358/296  |
|-----------|----|---|---------|-------------------|----------|
| 6,035,103 | A  | * | 3/2000  | Zuber             | 358/1.9  |
| 6,606,165 | B1 | * | 8/2003  | Barry et al.      | 358/1.9  |
| 6,636,903 | B2 | * | 10/2003 | Endoh et al.      | 710/8    |
| 6,798,530 | B1 | * | 9/2004  | Buckley et al.    | 358/1.13 |
| 7,092,963 | B2 | * | 8/2006  | Ryan et al.       | 1/1      |
| 7,489,422 | B2 | * | 2/2009  | Zuber             | 358/1.9  |
| 2002/0181022 | A1 | * | 12/2002 | Tokashiki       | 358/1.18 |
| 2005/0031392 | A1 | * | 2/2005  | Yamamoto et al. | 400/62   |
| 2005/0141057 | A1 | * | 6/2005  | Kumada et al.   | 358/504  |

FOREIGN PATENT DOCUMENTS

JP 2002-084433 3/2002

\* cited by examiner

*Primary Examiner* — Steven Kau
(74) *Attorney, Agent, or Firm* — Cowan, Liebowitz & Latman, P.C.

(57) ABSTRACT

This invention provides a color print control method of acquiring an optimum profile by a simple profile acquisition process in consideration of the clustering configuration. According to the color print control method of this invention, a printer manager (15) manages a combination of color printers as a virtual printer. A color setting manager (17) manages a color profile used for color matching in association with the virtual printer and output paper. A job controller (11) controls to accept a print job, whose destination is the managed virtual printer and which contains color matching settings, cause a rendering unit (18) to render the print job, acquire a profile for each virtual printer, and cause a color management processor (16) to perform color matching.

17 Claims, 29 Drawing Sheets

F I G. 4
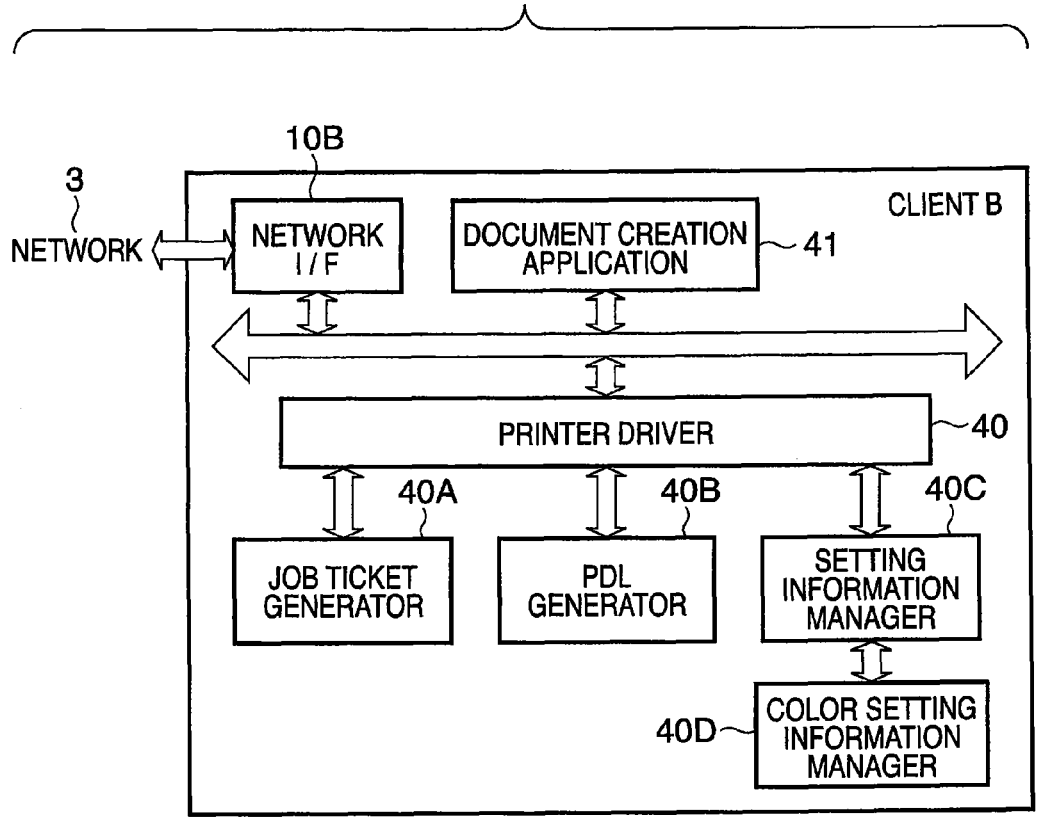
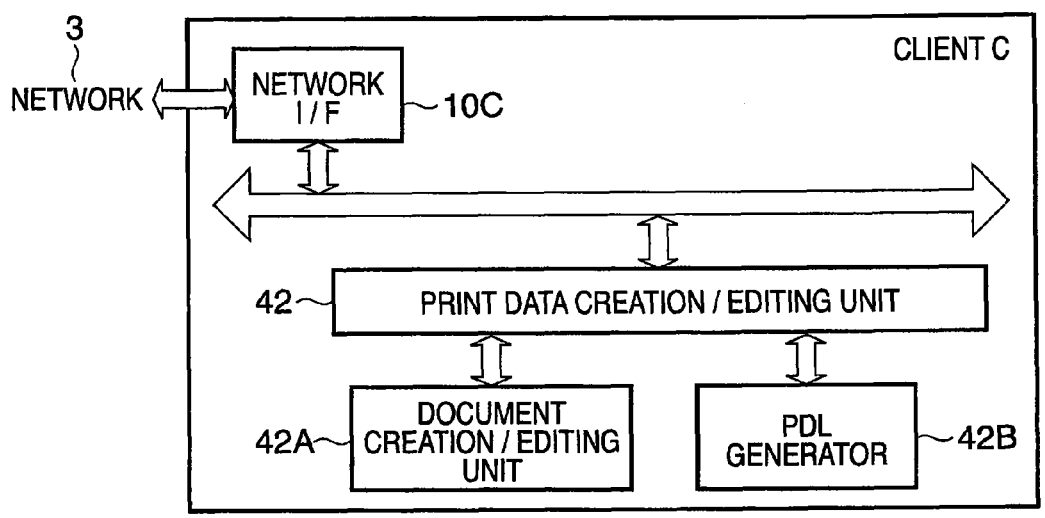

FIG. 5C

| 51 | | |
|---|---|---|
| COLOR SETTING NAME | NAME | |
| PRINTER PROFILE | PRINTER PROFILE | |
| GRAPHIC OBJECT SETTINGS | RGB TARGET PROFILE | |
| | RENDERING INTENT OF RGB TARGET PROFILE | |
| | CMYK TARGET PROFILE | |
| | RENDERING INTENT OF CMYK TARGET PROFILE | |
| | SPOT COLOR APPLICATION COLOR | |
| | CMYK SIMULATION | |
| | BLACK GUARANTEE | |

52 →

| 53 | 505 |
|---|---|
| ARBITRARY (WORKFLOW NAME) | |
| PAPER NAME | |
| PROFILE MANAGEMENT NAME | |
| · RELATIVE COLORIMETRIC<br>· ABSOLUTE COLORIMETRIC<br>· PERCEPTUAL<br>· SATURATION | |
| PROFILE MANAGEMENT NAME | |
| · RELATIVE COLORIMETRIC<br>· ABSOLUTE COLORIMETRIC<br>· PERCEPTUAL<br>· SATURATION | |
| SPOT COLOR SET | |
| · ON / · OFF | |
| · ON / · OFF | |

FIG. 6

RGB TARGET ~ 61
- PROFILE NAME — PROFILE ENTITY
- PROFILE NAME — PROFILE ENTITY
- PROFILE NAME — PROFILE ENTITY
  ⋮

CMYK TARGET ~ 62
- PROFILE NAME — PROFILE ENTITY
- PROFILE NAME — PROFILE ENTITY
- PROFILE NAME — PROFILE ENTITY
  ⋮

PRINTER PROFILE ~ 63
- REFERENCE ┬ PAPER NAME — PROFILE ENTITY
            ├ PAPER NAME — PROFILE ENTITY
            └ PAPER NAME — PROFILE ENTITY
              ⋮
- PRINTER ┬ PAPER NAME — PROFILE ENTITIES (CURRENT, IMMEDIATELY PRECEDING, INITIAL)
          ├ PAPER NAME — PROFILE ENTITIES (CURRENT, IMMEDIATELY PRECEDING, INITIAL)
          └ PAPER NAME — PROFILE ENTITIES (CURRENT, IMMEDIATELY PRECEDING, INITIAL)
- PRINTER ┬ PAPER NAME — PROFILE ENTITIES (CURRENT, IMMEDIATELY PRECEDING, INITIAL)
          ├ PAPER NAME — PROFILE ENTITIES (CURRENT, IMMEDIATELY PRECEDING, INITIAL)
          └ PAPER NAME — PROFILE ENTITIES (CURRENT, IMMEDIATELY PRECEDING, INITIAL)
- PRINTER ┬ PAPER NAME — PROFILE ENTITIES (CURRENT, IMMEDIATELY PRECEDING, INITIAL)
          ├ PAPER NAME — PROFILE ENTITIES (CURRENT, IMMEDIATELY PRECEDING, INITIAL)
          └ PAPER NAME — PROFILE ENTITIES (CURRENT, IMMEDIATELY PRECEDING, INITIAL)
- PRINTER ┬ PAPER NAME — PROFILE ENTITIES (CURRENT, IMMEDIATELY PRECEDING, INITIAL)
          ├ PAPER NAME — PROFILE ENTITIES (CURRENT, IMMEDIATELY PRECEDING, INITIAL)
          └ PAPER NAME — PROFILE ENTITIES (CURRENT, IMMEDIATELY PRECEDING, INITIAL)
  ⋮

SPOT COLOR ~ 64
- SET NAME ┬ COLOR NAME — CMYK VALUES IN PRINTER OUTPUT
           ├ COLOR NAME — CMYK VALUES IN PRINTER OUTPUT
           └ COLOR NAME — CMYK VALUES IN PRINTER OUTPUT
- SET NAME ┬ COLOR NAME — CMYK VALUES IN PRINTER OUTPUT
           ├ COLOR NAME — CMYK VALUES IN PRINTER OUTPUT
           └ COLOR NAME — CMYK VALUES IN PRINTER OUTPUT
  ⋮

FIG. 8B

| COLOR SETTING NAME | NAME | 821 |
|---|---|---|
| PRINTER PROFILE | PRINTER PROFILE | 822 |
| TEXT OBJECT SETTINGS | RGB TARGET PROFILE | 823 |
| | RENDERING INTENT OF RGB TARGET PROFILE | |
| | CMYK TARGET PROFILE | |
| | RENDERING INTENT OF CMYK TARGET PROFILE | |
| | SPOT COLOR APPLICATION | |
| | CMYK SIMULATION | |
| | BLACK GUARANTEE (PURE BLACK USED FOR TEXT) | |
| IMAGE OBJECT SETTINGS | RGB TARGET PROFILE | 824 |
| | RENDERING INTENT OF RGB TARGET PROFILE | |
| | CMYK TARGET PROFILE | |
| | RENDERING INTENT OF CMYK TARGET PROFILE | |
| | CMYK SIMULATION | |
| GRAPHIC OBJECT SETTINGS | RGB TARGET PROFILE | 825 |
| | RENDERING INTENT OF RGB TARGET PROFILE | |
| | CMYK TARGET PROFILE | |
| | RENDERING INTENT OF CMYK TARGET PROFILE | |
| | SPOT COLOR APPLICATION | |
| | CMYK SIMULATION | |
| | BLACK GUARANTEE | |

(Overall table labeled 82)

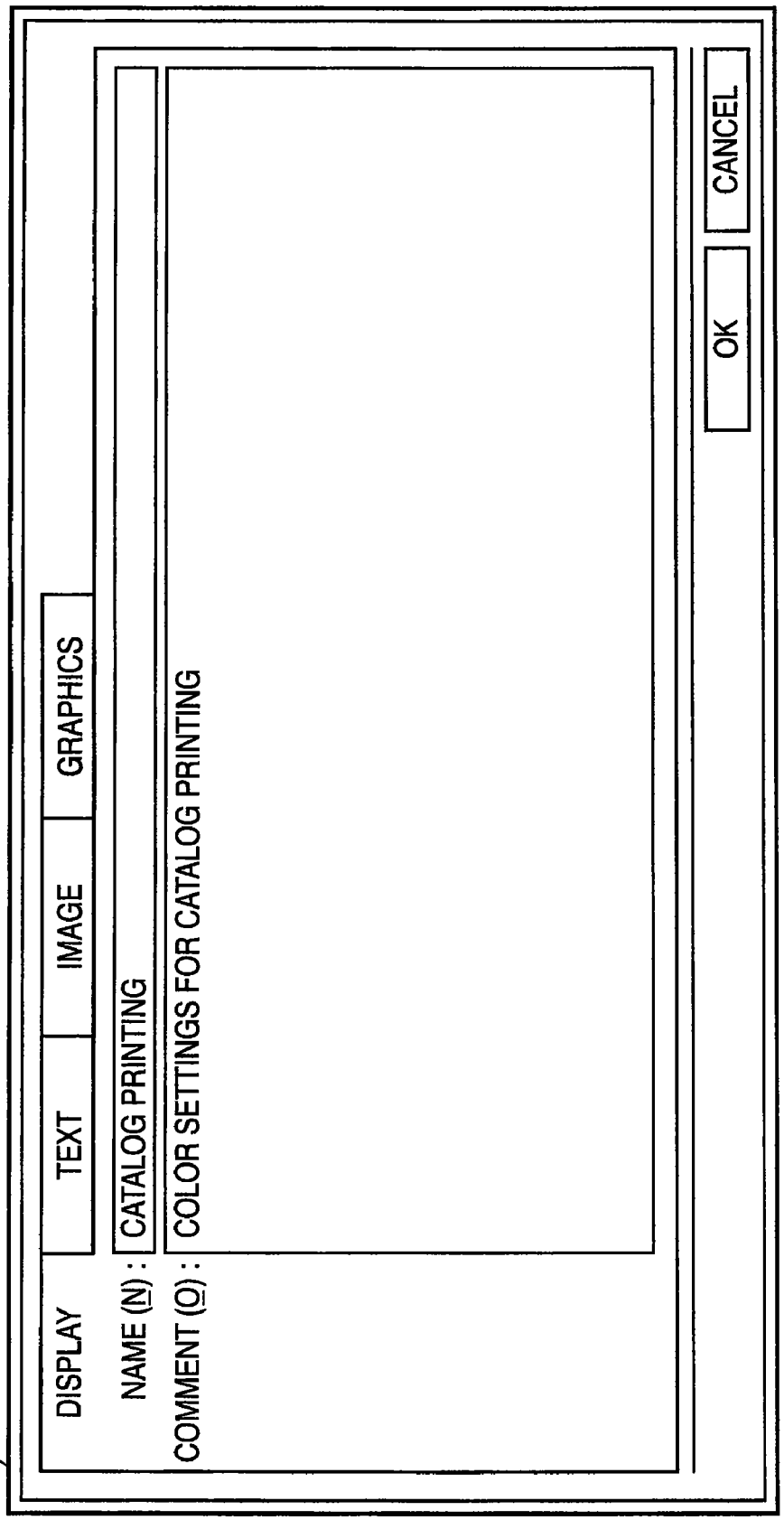

| COLOR SETTINGS | PROFILE MANAGEMENT |

SETTING TYPE (P):
PAPER ▼ — 111

SETTING LISTT (L): — 112

PRINTER NO. 1
  PLAIN PAPER
  THICK PAPER
PRINTER NO. 2
  PLAIN PAPER
  THICK PAPER
PRINTER NO. 3
  PLAIN PAPER
  THICK PAPER

NAME (N):
PLAIN PAPER

COMMENT (Q):
COMMENT ABOUT PLAIN PAPER IS DISPLAYED HERE.

CHECK (S):

| SETTING ITEM | SETTING CONTENTS |
|---|---|
| TYPE | PRINTER |
| COLOR SPACE | CMYK-Lab |
| LIGHT SOURCE | D50 |
| CREATION DATE & TIME | 2004 / 05 / 31 |

ADD (D)...   EDIT (T)...   DELETE (E)
113
114 — RESTORE PROFILE (R)...

OK   CANCEL   APPLY (A)

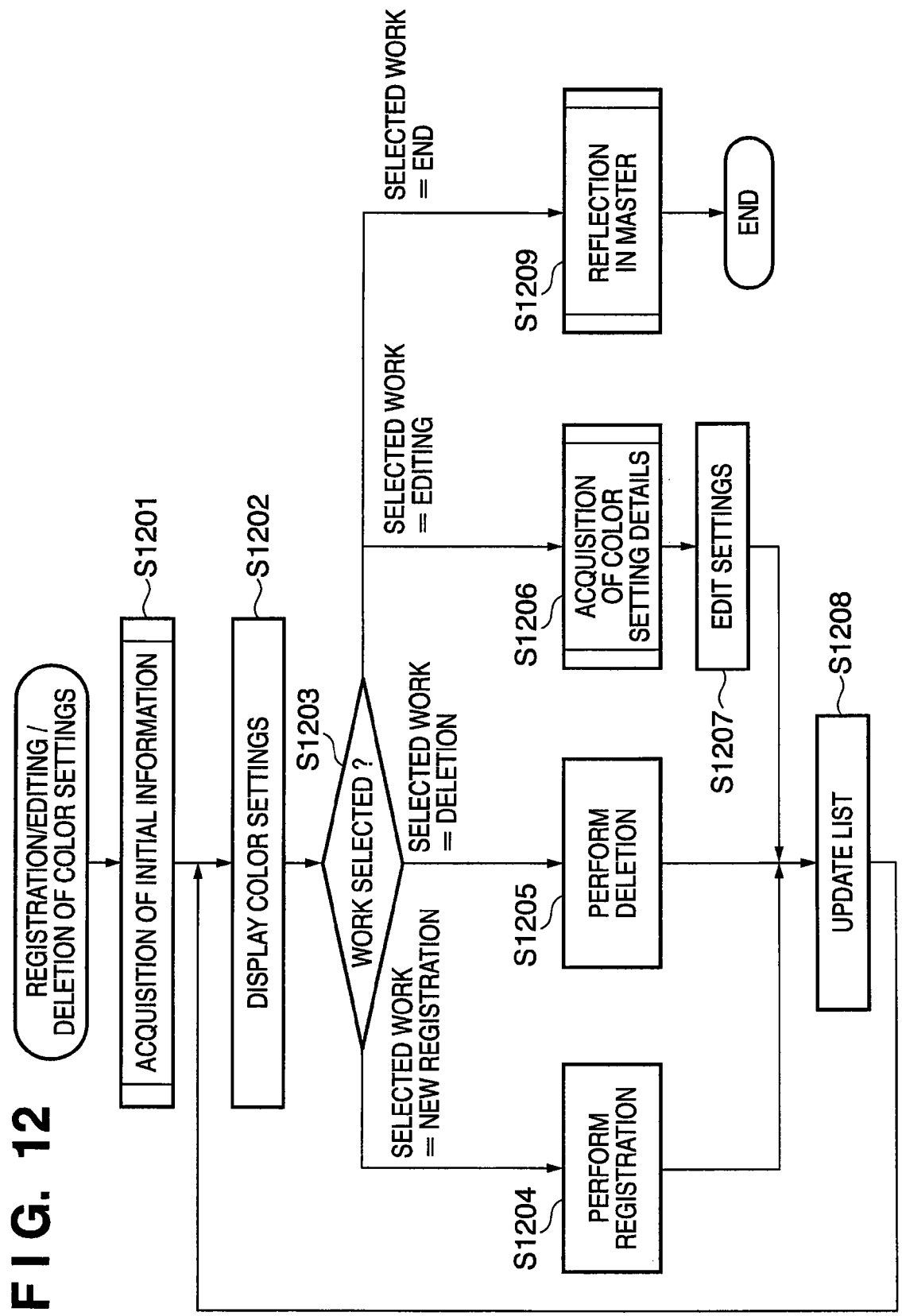

F I G. 19
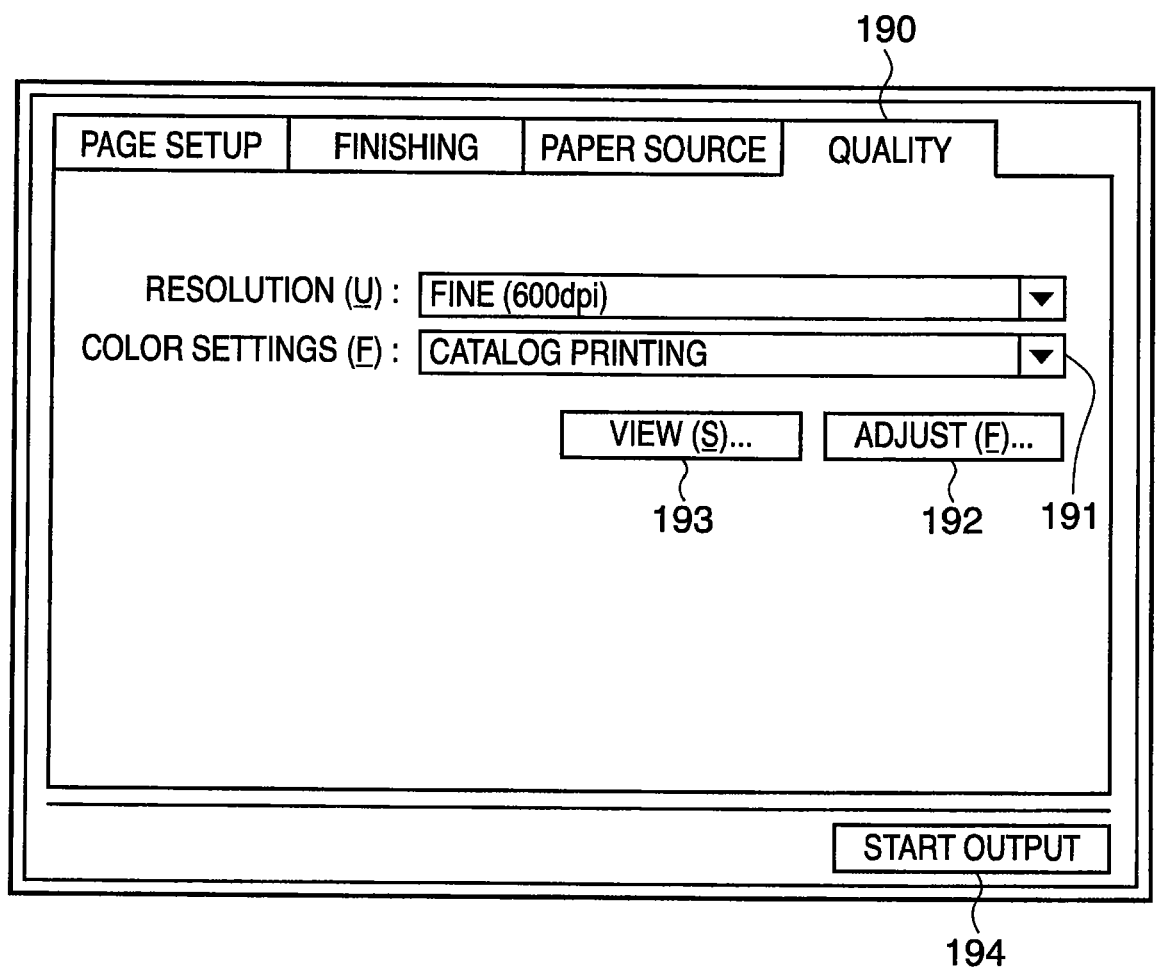

COLOR PRINT CONTROL METHOD AND APPARATUS FOR MANAGING COLOR PROFILE USED FOR COLOR MATCHING IN ASSOCIATION WITH A VIRTUAL PRINTER AND PAPER

BACKGROUND OF THE INVENTION

1. Field of the Invention

The present invention relates to a color print control method and apparatus and, more particularly, to a color matching setting method when outputting data to a plurality of color printers via a network.

2. Description of the Related Art

These days, POD (Print On Demand) has been proposed and is widely prevailing as one business printing field. The POD implements printing of various materials in small volumes. In the POD, electronic data is generally input as a document, and, for example, an electrophotographic printer prints out without making the plate of the data.

Along with the development of electrophotographic printers toward color printing, color printers have been introduced into the POD. Similar to conventional printing, color management is one of important subjects. In the POD, color management generally adopts color matching using an ICC profile. When stricter color matching is required, a plurality of profiles must be prepared as the ICC profile (printer profile) of a printer and selectively used in accordance with printout paper.

Recently in the POD, a clustering configuration also appears, in which a plurality of printers are connected to print out the same data. For example, according to a technique disclosed in Japanese Patent Laid-Open No. 2002-084433, a printer profile is selected in correspondence with paper.

However, printouts in the clustering configuration slightly differ between individual color printers of the cluster even if the color printers are of the same model. For this reason, it is necessary to provide a profile corresponding to printout paper for each printer. The following operation is necessary in a rendering unit which renders input print data or a control unit for the rendering unit in a printer control which controls clustering printing. In executing clustering printing, the rendering unit or control unit identifies a destination color printer, and acquires, from a printer profile management unit, a printer profile optimum for each printer and output-designated paper.

However, according to the technique disclosed in Japanese Patent Laid-Open No. 2002-084433, a printer profile is selected in correspondence with paper, but the relationship between a profile and a printer which forms a cluster is not managed. Hence, the rendering unit or control unit must acquire a profile for each printer, and repeats profile acquisition, resulting in a cumbersome process.

SUMMARY OF THE INVENTION

The present invention has been made to overcome the conventional drawbacks, and has as its object to provide a color print control method and apparatus for acquiring an optimum profile by a simple profile acquisition process in consideration of the clustering configuration.

To solve the above-described problems, a color print control apparatus according to the present invention comprising:

a printer management unit configured to manage a combination of color printers as a virtual printer;

a color setting management unit configured to manage a color profile used for color matching in association with the virtual printer and output paper;

a color management unit configured to perform a color matching process using the color profile;

a rendering unit configured to render a print job; and a print control unit configured to control to accept a print job, whose destination is the virtual printer managed by the printer management unit and which contains a color matching setting, render the print job, acquire a profile from the color setting management unit for each virtual printer, and cause the color management unit to perform color matching.

The color print control apparatus according to the present invention is further characterized as follows. The color setting management unit associates single paper with at least one profile. The color setting management unit manages the color profile, and also manages a color matching rule of the color management unit. A color matching setting accepted by the print control unit includes a color matching rule. The printer management unit includes printer information change unit configured to change managed virtual printer information, and the color setting management unit includes color setting information change unit configured to change managed color setting information. The print control unit comprises job data generation unit configured to generate, from a print job containing a color matching setting and a profile managed by the color setting management unit for each virtual printer, job data containing job ticket data and a job data file.

An information processing apparatus according to the present invention is an information processing apparatus connected via a network to a color print control apparatus including a printer management unit configured to manage a combination of color printers as a virtual printer, a color setting management unit configured to manage a color profile used for color matching in association with the virtual printer and output paper, a color management unit configured to perform a color matching process using the color profile, a rendering unit configured to render a print job, and a print control unit configured to control to accept a print job, whose destination is the virtual printer managed by the printer management unit and which contains a color matching setting, render the print job, acquire a profile from the color setting management unit for each virtual printer, and cause the color management unit to perform color matching, the information processing apparatus comprising color setting information change unit configured to change, via the network, color setting information managed by the color setting management unit. Further, the present invention is the information processing apparatus comprising:

a read unit configured to read out, via the network, color setting information managed by the color setting management unit;

a job data generation unit configured to generate, from the readout color setting information and designated virtual printer information, job data containing job ticket data and a job data file; and a job data transmission unit configured to transmit the generated job data to the color print control apparatus.

A color print control method according to the present invention is a color print control method for a color print control apparatus, comprising:

a printer management step of managing a combination of color printers as a virtual printer;

a color setting management step of managing a color profile used for color matching in association with the virtual printer and output paper;

a color management step of performing a color matching process using the color profile;

a rendering step of rendering a print job; and a print control step of controlling to accept a print job, whose destination is the virtual printer managed in the printer management step and which contains a color matching setting, render the print job, acquire a profile from the color setting management step for each virtual printer, and perform color matching in the color management step.

In the color setting management step, single paper is associated with at least one profile. In the color setting management step, the color profile is managed, and a color matching rule in the color management step is also managed. A color matching setting accepted in the print control step includes a color matching rule. The printer management step includes a printer information change step of changing managed virtual printer information, and the color setting management step includes a color setting information change step of changing managed color setting information. The print control step comprises a job data generation step of generating, from a print job containing a color matching setting and a profile managed in the color setting management step for each virtual printer, job data containing job ticket data and a job data file.

A color print control method for an information processing apparatus is a color print control method for an information processing apparatus connected via a network to a color print control apparatus including a printer management unit configured to manage a combination of color printers as a virtual printer, a color setting management unit configured to manage a color profile used for color matching in association with the virtual printer and output paper, a color management unit configured to perform a color matching process using the color profile, a rendering unit configured to render a print job, and a print control unit configured to control to accept a print job, whose destination is the virtual printer managed by the printer management unit and which contains a color matching setting, render the print job, acquire a profile from the color setting management unit for each virtual printer, and cause the color management unit to perform color matching, the method comprising a color setting information change step of changing, via the network, color setting information managed by the color setting management unit. Further, the present invention is a method comprising:

a read step of reading out, via the network, color setting information managed by the color setting management unit;

a job data generation step of generating, from the readout color setting information and designated virtual printer information, job data containing job ticket data and a job data file; and a job data transmission step of transmitting the generated job data to the color print control apparatus.

The present invention is a computer-executable program which implements a color print control method defined in above color print control method. Further, the present invention is a storage medium which stores the program in a computer-readable form.

The present invention can provide a color print control method and apparatus for acquiring an optimum profile by a simple profile acquisition process in consideration of the clustering configuration.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a block diagram showing the arrangements of clients B and C according to the embodiment of the present invention;

FIGS. 5A to 5C are schematic views for explaining one record of color setting information which is stored in a color setting storage 17A and managed by a color setting manager 17 according to the embodiment of the present invention;

FIG. 6 is a schematic view for explaining the management format of a color profile which is stored in the color setting storage 17A and managed by the color setting manager 17 according to the embodiment of the present invention;

FIGS. 8A and 8B are views for explaining an example of job data and job ticket data according to the embodiment of the present invention;

FIGS. 10A and 10B are views showing display examples of a color setting editing window by the color setting editing unit 30 according to the embodiment of the present invention;

FIG. 11 is a view showing a display example of a profile management window 92 by the color setting editing unit 30 according to the embodiment of the present invention;

FIG. 12 is a flowchart for explaining the sequence of a process concerning color settings using the color setting editing unit 30 according to the embodiment of the present invention;

FIG. 19 is a view showing a display example of a print quality setting window according to the embodiment of the present invention;

DESCRIPTION OF THE EMBODIMENT

Preferred embodiments of the present invention will now be described in detail in accordance with the accompanying drawings.

<Description of System Configuration and System Building Elements>

A system configuration and the building elements of the system according to the embodiment will be described with reference to FIGS. 1 to 4.

(System Configuration Example)

Figure 1:
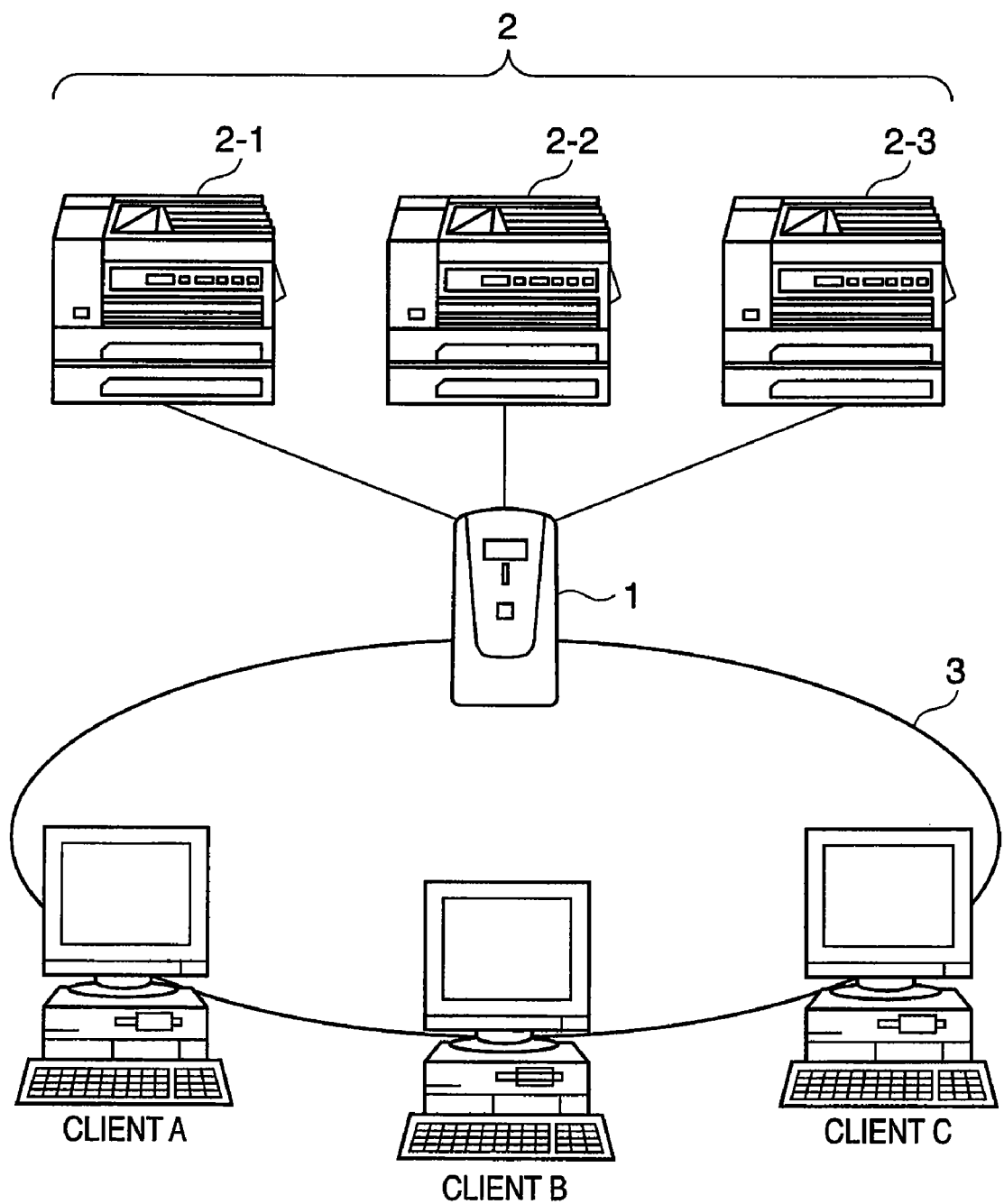
FIG. 1 is a view showing the configuration of a printing system according to an embodiment of the present invention.

FIG. 1 is a view showing a configuration of a network system in which a plurality of color printers are connected via a network according to the embodiment.

The network system in FIG. 1 includes a front-end server 1 serving as a printer controller, and a printer engine 2 (connected to a network 3 via the front-end server 1). Clients A, B, and C each having a PC and monitor are connected via the network 3. Each of clients A, B, and C comprises a CPU and VRAM necessary for monitor display and an image process, and a communication function necessary for communication on the network.

A plurality of printer engines 2 are connectable. A cluster can be formed from an arbitrary combination of connected printer engines. In the embodiment, a total of three printer engines 2-1, 2-2, and 2-3 are connected. In the following description, the printer engine 2 means not an individual printer engine but all printer engines, unless otherwise specified.

(Arrangement Examples of Front-End Server 1 and Printer Engine 2)

Figure 2:
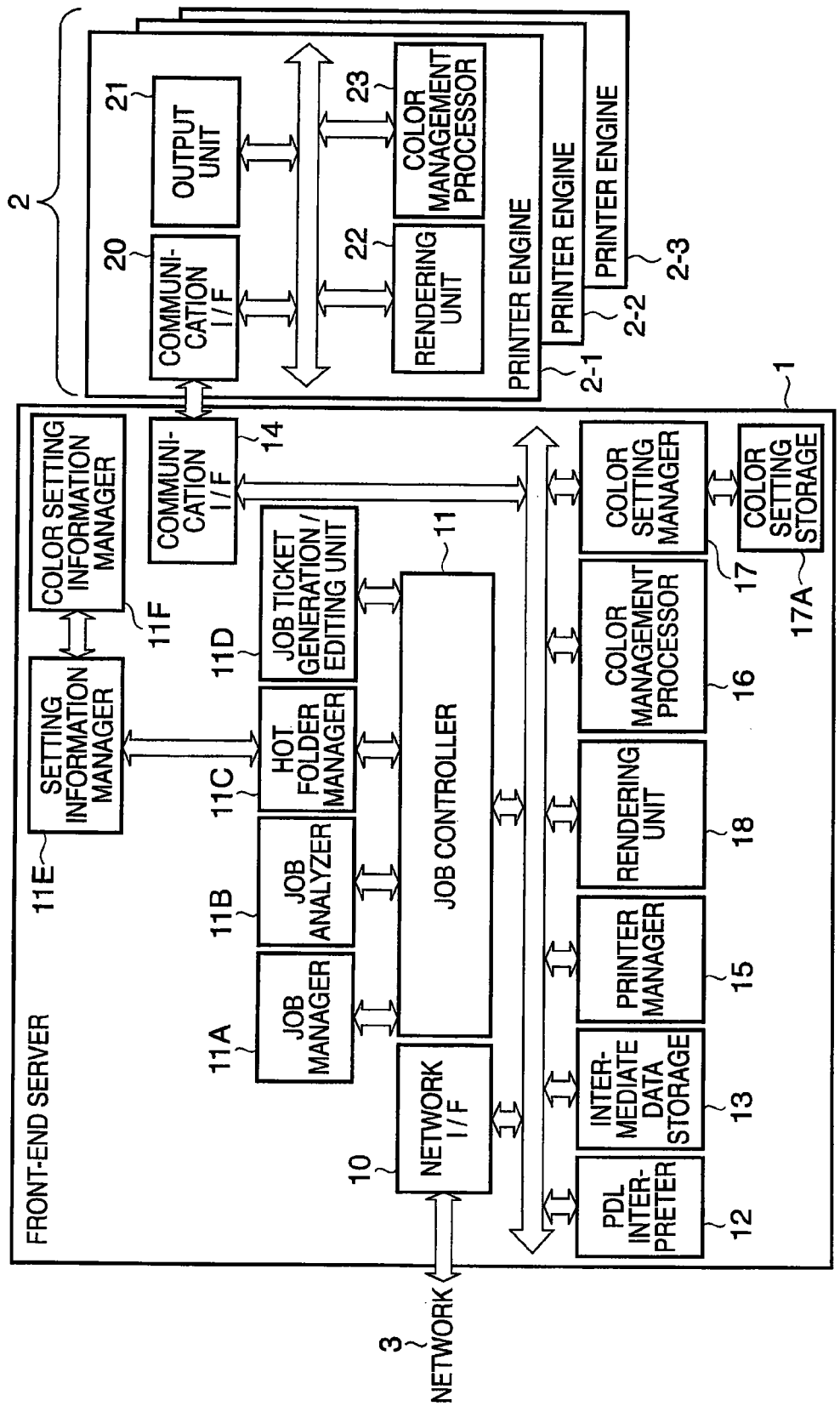
FIG. 2 is a block diagram showing the arrangements of a front-end server 1 and printer engine 2 according to the embodiment of the present invention.

FIG. 2 is a block diagram showing arrangements of the front-end server 1 and printer engine 2.

As shown in FIG. 2, the front-end server 1 comprises a network I/F (interface) 10 for connecting the front-end server 1 to a network, and a job controller 11 which controls job data. The front-end server 1 also comprises a PDL interpreter 12 which interprets PDL (Page Description Language) to generate intermediate data, and an intermediate data storage 13 which stores intermediate data generated by the PDL interpreter. Further, the front-end server 1 comprises a communication interface 14 for exchanging data with the printer engine 2, and a printer manager 15 which manages the clustering configuration of the printer engine 2 connected to the front-end server 1. The front-end server 1 comprises a rendering unit 18 which converts intermediate data stored in the intermediate data storage into bitmap image data, and a color management processor 16 which performs a color matching process designated for a job. The front-end server 1 comprises a color setting manager 17 which holds and manages a data set for color settings, and provides color matching settings to respective units. The data set is a set of a profile used for color matching, various parameters for performing color matching, a profile for use, and the like. The data set will be called color settings. The color setting manager 17 has a color setting storage 17A which stores profiles and color settings used for color matching.

The job controller 11 comprises a job manager 11A which manages a job, for example, holds a job, and a job analyzer 11B which analyzes a job ticket in a job. Also, the job controller 11 comprises a hot folder manager 11C which prepares job data by assigning a job ticket to a job data file. The hot folder manager 11C monitors a directory for accepting job data from client C. The hot folder manager 11C prepares job data by assigning a job ticket to a job data file input to the directory based on contents set in advance. The job controller 11 also comprises a job ticket generation/editing unit 11D which edits job data managed by the job manager 11A, and generates and edits a job ticket. The job controller 11 comprises a setting information manager 11E which manages the setting contents and the like of a job ticket generated and assigned to a job data file input to the hot folder manager 11C. The job controller 11 comprises a color setting information manager 11F which manages especially information on color matching out of pieces of information managed by the setting information manager 11E.

The printer engine 2 comprises a communication I/F 20 which exchanges data with the front-end server 1, and an output unit 21. The printer engine 2 also comprises a rendering unit 22 which converts intermediate data transmitted from the front-end server 1 into bitmap image data, and a color management processor 23 which performs a color matching process designated for a job.

(Arrangement Example of Client A)

Figure 3:
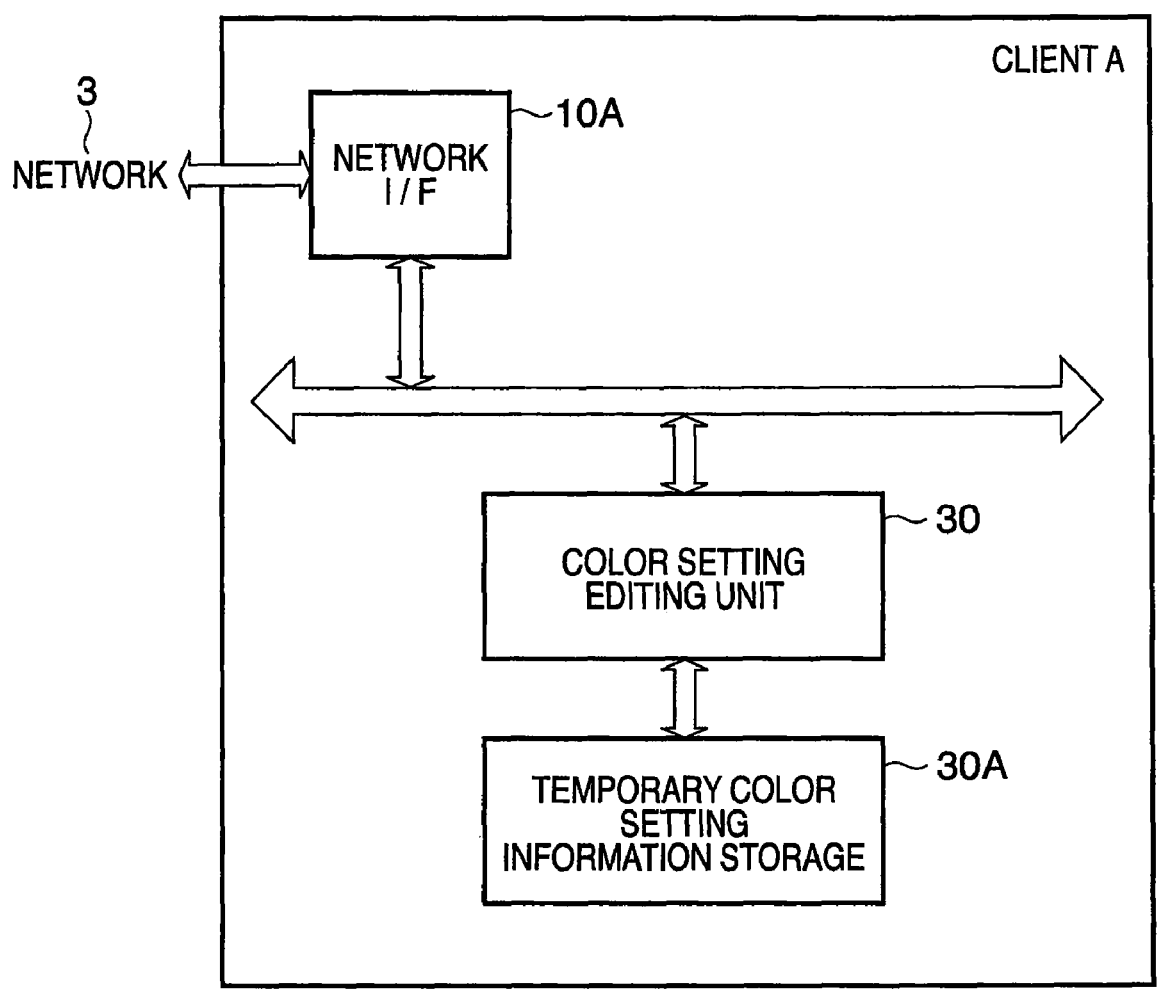
FIG. 3 is a block diagram showing the arrangement of client A according to the embodiment of the present invention.

FIG. 3 is a block diagram showing an arrangement of client A according to the embodiment.

As shown in FIG. 3, client A comprises a network I/F 10A equivalent to the network I/F 10 of the front-end server 1. Client A comprises a color setting editing unit 30 which newly registers, deletes, and edits a profile and color settings that are stored in the color setting storage 17A of the front-end server 1. The color setting editing unit 30 has a temporary color setting information storage 30A to acquire part or all of information stored in the color setting storage 17A from the front-end server 1 and temporarily store the acquired information while the color setting editing unit 30 is used.

(Arrangement Examples of Clients B and C)

FIG. 4 is a block diagram showing arrangements of clients B and C according to the embodiment.

As shown in FIG. 4, client B comprises a network I/F 10B and printer driver 40. The network I/F 10B is equivalent to the network I/F 10 of the front-end server 1 and the network I/F 10A of client A. The printer driver 40 comprises a job ticket generator 40A which is used by a document creation application 41 capable of creating PDL, and generates a job ticket as a constituent component of job data. The printer driver 40 comprises a PDL generator 40B which analyzes a document created by the document creation application and generates PDL based on the analysis result. Further, the printer driver 40 comprises a setting information manager 40C which manages information such as the setting contents of a job ticket, and a color setting information manager 40D which manages particularly a process associated with color matching out of pieces of information managed by the setting information manager 40C.

The printer driver 40 composites PDL and a job ticket into job data, and outputs the job data to the front-end server 1 via the network I/F 10B.

Client C comprises a network I/F 10C equivalent to the network I/F 10B of client B. Client C comprises a print data creation/editing unit 42 which allows the system operator to create and edit print data, create PDL, and input the PDL to a directory monitored by the hot folder manager 11C. The print data creation/editing unit 42 comprises a document creation/editing unit 42A which allows the operator to create and edit a document, and a PDL generator 42B which analyzes a document created by the document creation/editing unit 42A, and generates PDL based on the analysis result.

The system configuration and building elements have been described with reference to FIGS. 1 to 4.

The front-end server 1 in FIG. 2, and clients A to C in FIGS. 3 and 4 may be formed from general- or special-purpose computers. In this case, while using the RAM as a temporary storage or an external storage (e.g., disk) as a database, the CPU executes programs stored in the ROM or external storage, implementing the respective processors. Each storage is desirably provided in the external storage.

In the embodiment, three clients are connected. However, a plurality of clients equivalent to each of clients A, B, and C may also be connected.

The arrangement of client A may exist in the front-end server 1. A plurality of clients A may exist, but it is desirable to limit the number of clients capable of simultaneously editing color settings to one. Only either client B or C may also be connected. Moreover, one client may incorporate the arrangements of clients A, B, and C.

<Description of Structure Example of Data Used in Embodiment>

Data mainly used in the embodiment will be described with reference to FIGS. 5A to 8B.

(Structure Example of Color Setting Information)

Figure 5A:
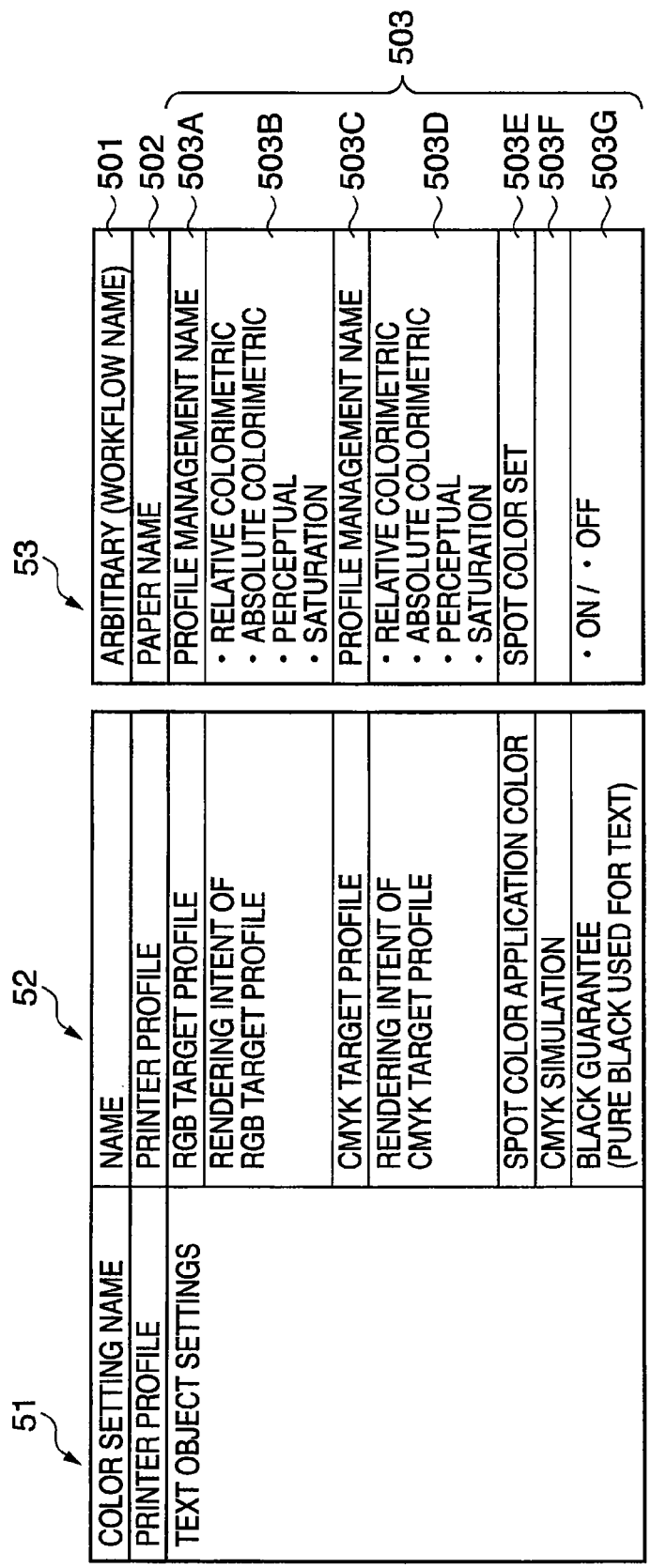
Figure 5B:
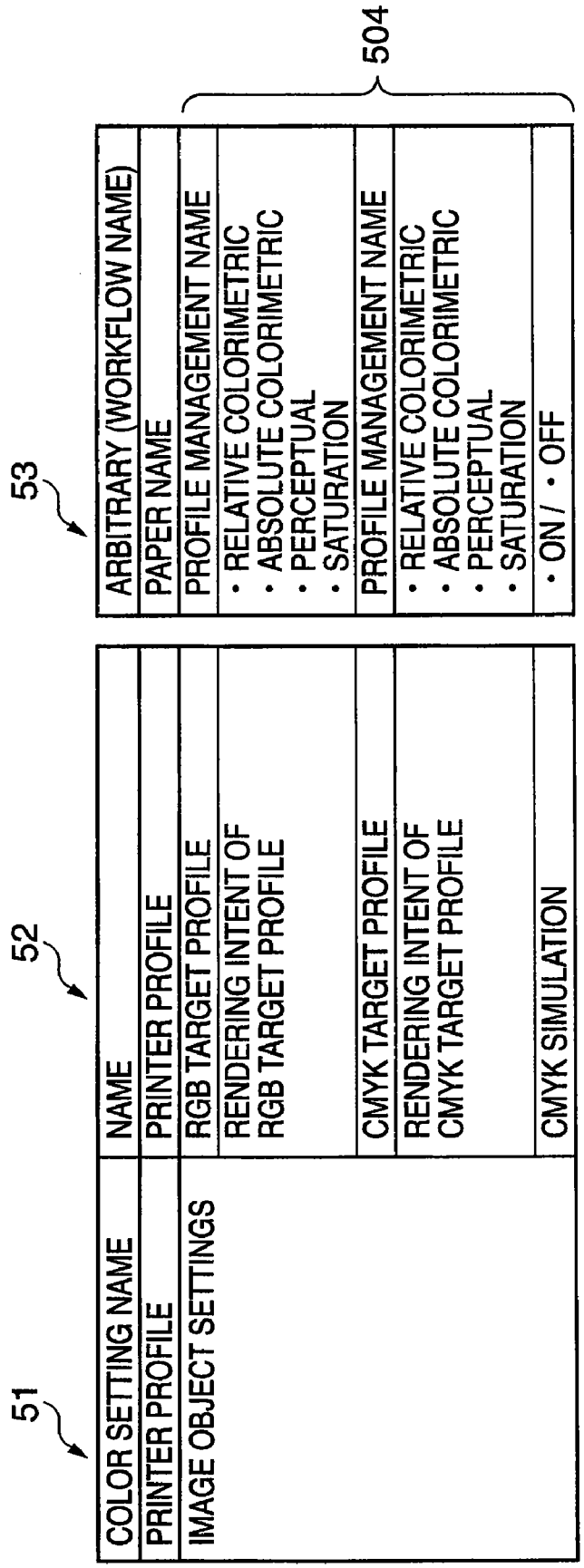

FIGS. 5A to 5C are schematic views for explaining one record of color setting information which is stored in the color setting storage 17A of the front-end server 1 and managed by the color setting manager 17.

As described above, the color setting information describes a color matching process in addition to a rendering intent and a profile applied to perform a color matching process for job data. The color management processor 16 in the front-end server 1 executes a color matching process complying with the description contents.

As shown in FIGS. 5A to 5C, the color setting information is managed hierarchically by a data category 51 and data item 52. Contents described in a registered data description content example 53 are registered in the data items. In the registered data description content example 53, an item described in italics is alternatively selected from a description item, and stored in the color setting storage 17A in association with the data category 51 and data item 52.

The color setting information is made up of the following five categories. First, the color setting information has a printer profile field 502 which describes a printer profile name used in the color matching process. The color setting information has a text object setting category 503 which describes a target profile used in a color matching process for a text object, a rendering intent in color matching, other special process settings, and the like. The text object setting category 503 categorizes settings applied to a color matching process for a text object described in PDL of job data. The color setting information has an image object setting category 504 which categorizes settings applied to a color matching process for an image object described in PDL of job data, similar to the text object setting category 503. The color setting information has a graphic object setting category 505 which categorizes settings applied to a color matching process for a graphic object described in PDL of job data. The color setting information has a color setting name field 501 which manages, as one record, settings in the printer profile field 502 to the graphic object setting category 505.

A set of data in these five categories is managed as one record. In the embodiment, a plurality of records are stored in the color setting storage 17A and managed by the color setting manager 17.

The text object setting category 503 among the five categories includes an RGB target profile field 503A which describes a profile name applied when a text object is RGB data. The text object setting category 503 includes an RGB rendering intent field 503B which designates a color matching method when the RGB target profile field 503A is applied. The text object setting category 503 includes a CMYK target profile field 503C which describes the profile name of a simulation target when a text object is CMYK data or CMYK simulation is to be performed. The text object setting category 503 includes a CMYK rendering intent field 503D which designates a color matching method when the CMYK target profile field 503C is applied. The text object setting category 503 includes a spot color application color setting field 503E which describes a spot color set name (to be described later). The text object setting category 503 includes a CMYK simulation setting field 503F which sets whether or not to apply CMYK simulation. The text object setting category 503 includes a black guarantee setting field 503G which sets whether or not to apply black guarantee.

The image object setting category 504 and graphic object setting category 505 also have the same data items 52 as those of the text object setting category 503, a detailed description of which will not be repeated.

(Profile Management Form Example)

FIG. 6 is a schematic view for explaining a management format of a color profile which is stored in the color setting storage 17A of the front-end server 1 and managed by the color setting manager 17. In the first embodiment, the management format is managed by roughly dividing it into an RGB target 61, CMYK target 62, printer profile 63, and spot color conversion set 64.

The RGB target 61 and CMYK target 62 manage pairs of color profile entities and profile names. Color setting information in the embodiment describes a profile name, and the color setting manager 17 specifies a paired color profile entity.

The printer profile 63 manages pairs of color profile entities and profile names for each printer engine 2. The profile name is a paper name. Although a detailed description of the color profile entity will be omitted, the following three data are managed on the assumption of correction by calibration. The three data are an initial profile immediately after creating a profile, a profile immediately before executing correction, and a current profile actually used for the color matching process.

The printer profile 63 manages pairs of paper names and profile entities as a reference profile serving as a color matching reference in clustering, in addition to profiles corresponding to the printer engines 2-1, 2-2, and 2-3.

Unlike color profiles, the entity of the spot color conversion set 64 is a set of data each made up of a pair of a color name (e.g., specific ink name) described in PDL, and C, M, Y, and K values in printer output. One unit data will be called spot color data, and one set will be called a spot color set. The spot color set is given a name (to be referred to as a spot color set name hereinafter). Color setting information in the embodiment describes the spot color set name, and the color setting manager 17 specifies a paired spot color set.

The color management processor 16 in the front-end server 1 executes color matching in the embodiment using an RGB target or CMYK target as an input profile and the above-mentioned reference profile as an output profile. The color management processor 23 in the printer engine 2 executes color matching using the reference profile as an input profile and a printer profile managed for each printer engine 2 as an output profile. The front-end server 1 applies a spot color when a job data file describes a color name instead of a color matching process using input and output profiles. The color matching process is achieved by a known technique.

(Structure Example of Virtual Printer Management Data)

Figure 7:
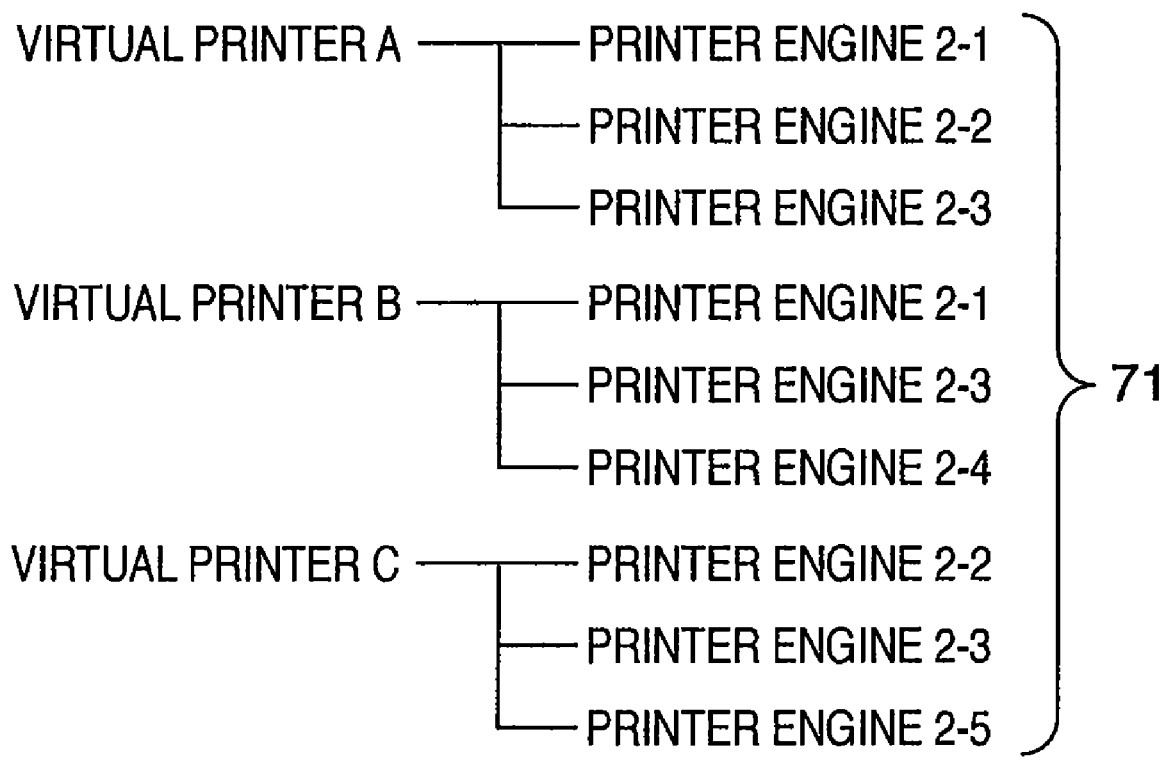
FIG. 7 is a schematic view showing virtual printer management data managed by a printer manager 15 in the front-end server 1 according to the embodiment of the present invention.

FIG. 7 is a schematic view showing a structure of virtual printer management data managed by the printer manager 15 in the front-end server 1.

A virtual printer in the embodiment means a combination of printer engines 2 when the printer engines 2 connected to the front-end server 1 are arbitrarily combined and clustered. By combining the printer engines 2, a plurality of printers can be treated virtually as one printer. Virtual printer management data 71 associates a virtual printer with the clustered printer engines 2. In the embodiment, virtual printer A corresponds to the printer engines 2-1, 2-2, and 2-3. Virtual printer B corresponds to the printer engines 2-1 and 2-3 and a printer engine 2-4 (not shown in FIG. 2). Virtual printer C corresponds to the printer engines 2-2 and 2-3 and a printer engine 2-5 (not shown in FIG. 2).

(Structure Example of Job Ticket)

Figure 8A:
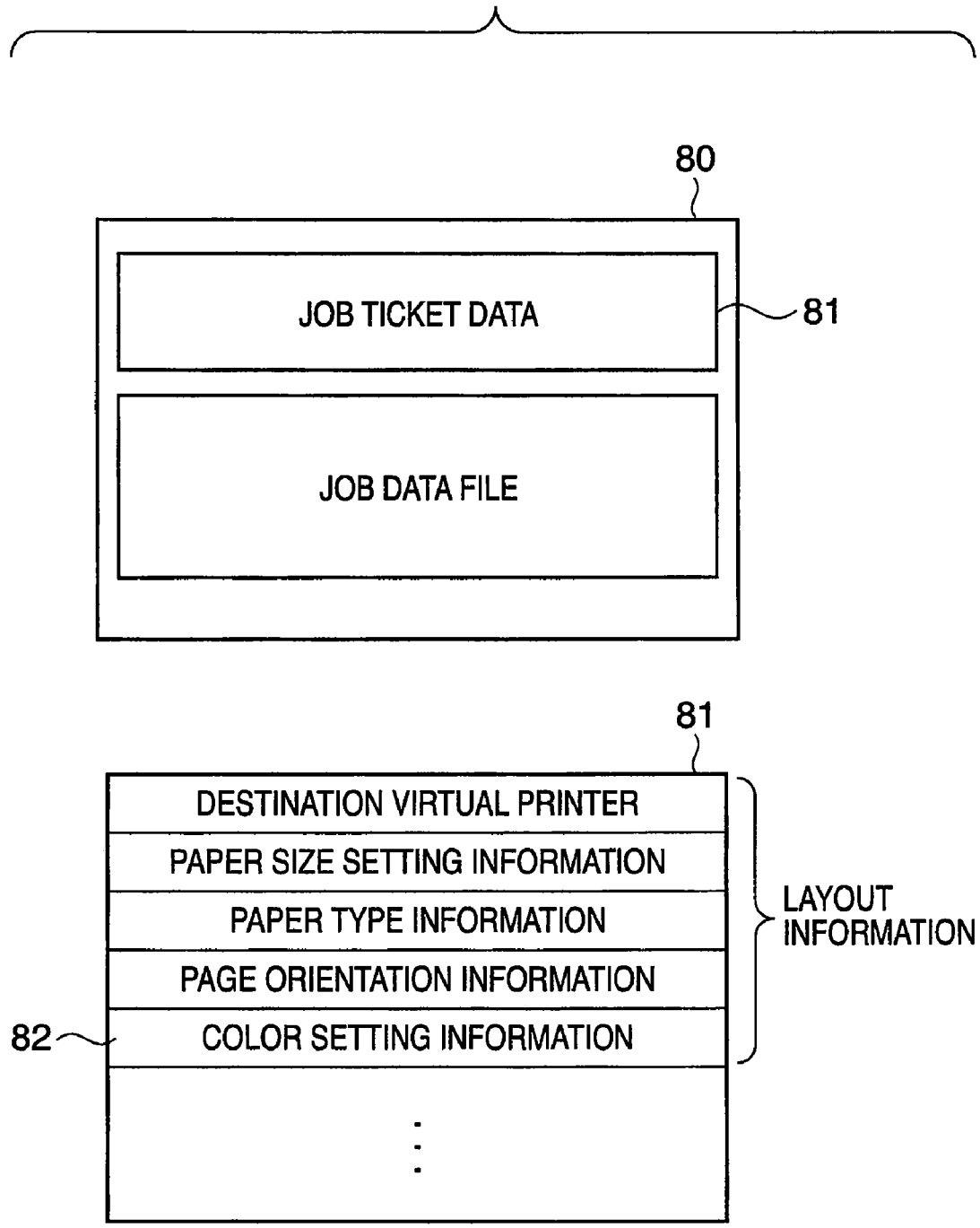

FIGS. 8A and 8B show an example of job data and job ticket data.

Job data 80 is made up of job ticket data 81 which describes contents designating a process, and a job data file serving as actual output data such as PDF, PS, TIFF, or JPEG.

The job ticket data 81 contains, as layout information, paper size setting information, paper type information, and page orientation information. The job ticket data 81 contains color setting information 82 as information on color management.

The color setting information 82 is a description of color setting information in the job ticket data 81. The color setting information 82 contains a color setting name 821, printer profile 822, text object setting category 823, image object setting category 824, and graphic object setting 825.

The color setting information 82 can describe the same contents as color setting information described with reference to FIGS. 5A to 5C that are stored in the color setting storage 17A of the front-end server 1 and managed by the color setting manager 17.

The color setting manager 17 can recognize details of the setting contents of the color setting information 82. Thus, for color settings managed by the color setting manager 17, the color setting information 82 may also describe only the color setting name 821.

For color settings not managed by the color setting manager 17, the color setting information 82 describes the printer profile 822, text object setting category 823, image object setting category 824, and graphic object setting 825. The color setting name 821 describes a specific name representing that the color setting manager 17 does not manage these settings. In the embodiment, a character string "separate settings" is used as the color setting name.

<Operation Examples of Registration, Editing, and Deletion of Color Setting Information>

Registration, deletion, and editing of color setting information stored in the color setting storage 17A will be explained with reference to FIGS. 9 to 15.

According to the embodiment, based on an operation by the operator for color setting information, color settings are newly registered in the color setting storage 17A, or registered color settings are edited or deleted. At this time, the color setting editing unit 30 in client A communicates with the color setting manager 17 in the front-end server 1 via the network I/Fs 10A and 10B.

(Window Display Examples by Color Setting Editing Unit 30)

Window display examples by the color setting editing unit 30 in client A will be explained with reference to FIGS. 9 to 11.

(Initial Display Window Example)

Figure 9:
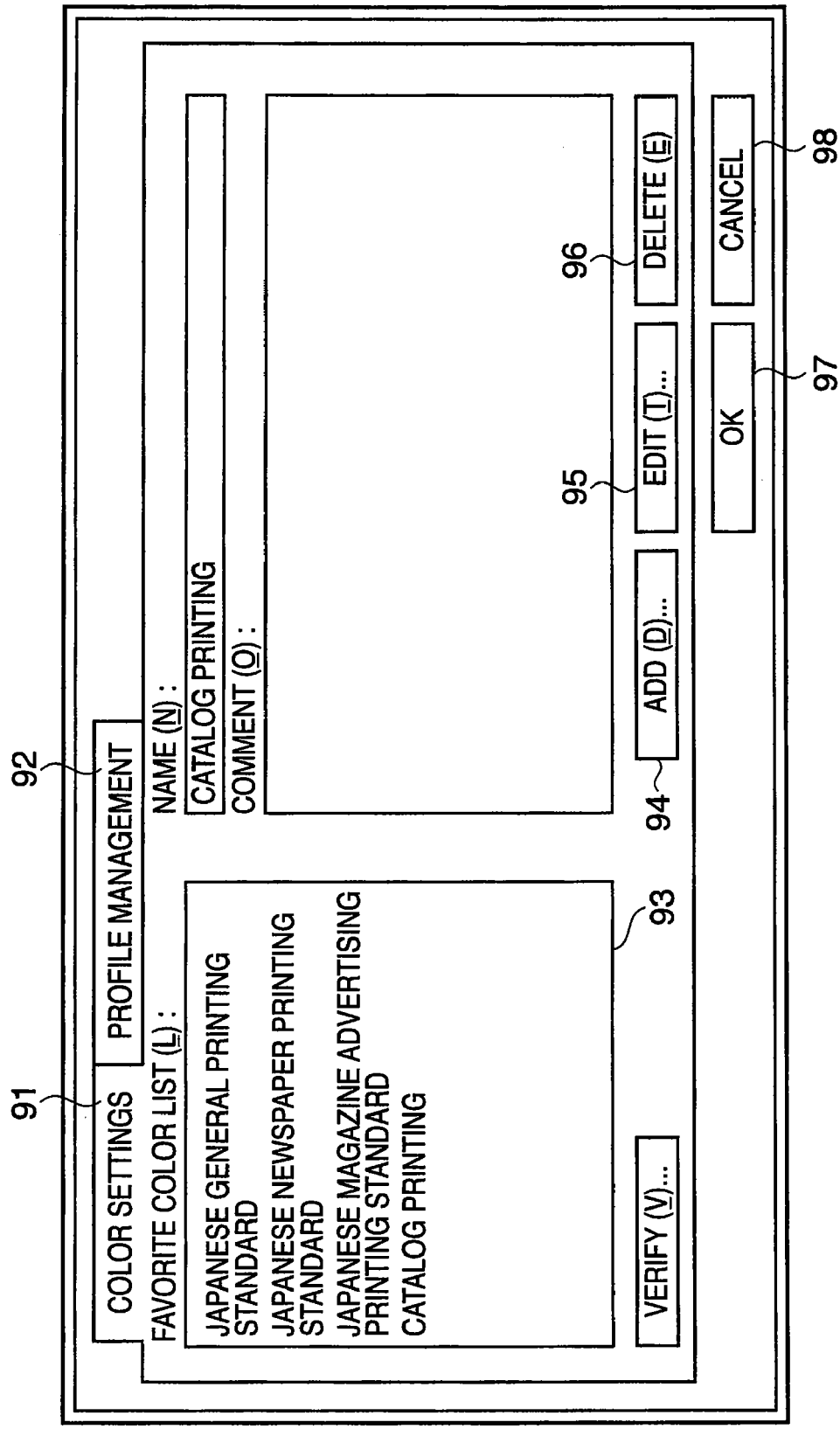
FIG. 9 is a view showing a display example of an initial display window by a color setting editing unit 30 according to the embodiment of the present invention.

FIG. 9 shows a display example of an initial display window upon activating the color setting editing unit 30 according to the embodiment.

The color setting editing unit 30 has, as a main window, two, color setting window 91 and profile management window 92. The main window has a subwindow displayed by selecting a function in the main window. The subwindow appears as needed. The color setting window 91 and profile management window 92 are switchable by, for example, clicking a desired window display with a pointing device such as a mouse. The main window immediately after activation displays the color setting window 91.

(Example of Color Setting Window 91)

The color setting window 91 has a color setting list display column 93 which displays a list of color setting names managed by the color setting manager 17. Also, the color setting window 91 has a registration button 94, edit button 95, and delete button 96. With the registration button 94, the operator starts creating new color settings. With the edit button 95, the operator designates the start of editing color settings alternatively selected in the color setting list display column 93. With the delete button 96, the operator designates deletion of color settings alternatively selected in the color setting list display column 93. The color setting window 91 has an OK button 97 and cancel button 98. With the OK button 97, the operator ends the use of the color setting editing unit 30, and reflects the use result in the color setting manager 17 of the front-end server 1. With the cancel button 98, the operator discards the operation contents of the color setting editing unit 30, and ends the use of the color setting editing unit 30.

(Examples of Color Setting Editing Window and Color Setting Registration Window)

Figure 10B:
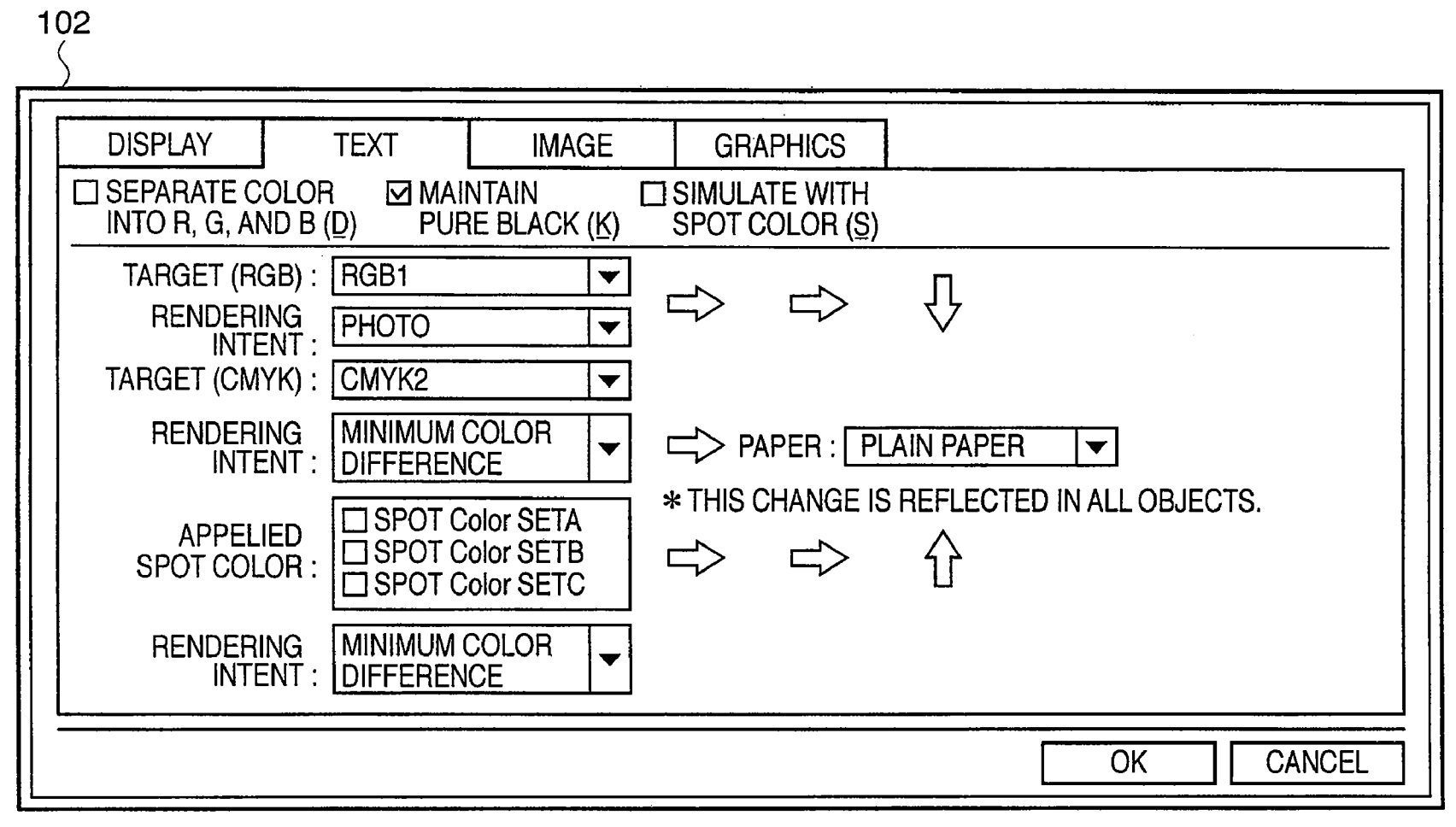

FIGS. 10A and 10B show display examples of a color setting editing window displayed when the operator alternatively selects color settings displayed in the color setting list display column 93 in the color setting window 91, and designates editing of color settings with the edit button 95. The color setting registration window also has the same window display, and will also be explained with reference to FIGS. 10A and 10B.

In FIG. 10A, reference numeral 101 denotes a display example of a color setting name editing window in the color setting editing window. In the color setting name editing window 101, the operator edits the color setting name field

501. When the operator designates creation of new color settings with the registration button 94, blank columns appear for respective items.

In FIG. 10B, reference numeral 102 denotes a text object setting editing window for editing the setting contents of the data items 52 whose data category 51 belong to the text object setting category 503. The text object setting editing window 102 displays, as an initial state, the setting contents of the text object setting category 503 at color settings to be edited. The color setting manager 17 which manages settable values to be stored in the color setting storage 17A acquires values settable in the setting items. Then, the operator selects and edits the acquired settable values in the window 102. In registering new color settings, the window 102 displays default values or selected values designated by the operator.

Display examples of the color setting editing window and color setting registration window have been described with reference to FIGS. 10A and 10B. The data items 52 in the image object setting category 504 can be edited in an image object setting editing window (not shown), similar to the text object setting editing window 102. The data items 52 in the graphic object setting category 505 can be edited in a graphic object setting editing window (not shown), similar to the text object setting editing window 102.

(Example of Profile Management Window 92)

FIG. 11 shows a display example of the profile management window 92.

In this window, the operator registers, edits, or deletes a profile and spot color conversion set described with reference to FIG. 6. Printer profiles are registered using paper names for the printer engines 2-1, 2-2, and 2-3. In clustering, a profile is registered using a paper name common to clustered printer engines. The operator also registers a reference profile via this window.

In FIG. 11, a profile type selection column 111 is used to select the type of profile described with reference to FIG. 6. Profiles displayed in a registered profile list display 112 are switched depending on the type of profile selected in the column 111. In FIG. 11, printer profiles are displayed.

A profile operation designation button group 113 is used to newly add, edit, or delete a profile. A profile is newly added for a printer engine selected in the profile list. A profile alternatively selected in the registered profile list display 112 is edited or deleted.

A profile rollback button 114 is used to issue a rollback instruction to return a printer profile alternatively selected in the registered profile list display 112 to the current settings of an immediately preceding or initial profile. By pressing the profile rollback button 114, a window further appears. The operator designates either the immediately preceding profile or initial profile via this window, and designates the start of rollback, rolling back the profile.

<Example of Color Setting Information Maintenance Process by Color Setting Editing Unit 30>

The sequence of a color setting information maintenance process by the color setting editing unit 30 of client A will be described with reference to FIGS. 12 to 15.

FIG. 12 is a flowchart for explaining a sequence of a process concerning color settings in the color setting window 91 by the color setting editing unit 30. The flowchart shown in FIG. 12 starts when the operator instructs client A to activate the color setting editing unit 30.

Upon activation, in step S1201, the color setting editing unit 30 requests the color setting manager 17 of the front-end server 1 via the network I/F 10A to acquire information managed by the color setting manager 17. Information to be acquired includes a color setting list of color setting names described in the color setting name field 501 for color settings, and values settable in the data items 52 of color settings. The color setting editing unit 30 acquires the color setting list and settable values transmitted from the color setting manager 17 in response to the acquisition request, and stores them in the temporary color setting information storage 30A.

In step S1202, the color setting editing unit 30 sets the color setting list acquired in step S1201 in the color setting list display column 93, and displays the color setting window 91. After displaying the color setting window 91, the color setting editing unit 30 waits in step S1203 for a work selection instruction from the operator. The process branches in accordance with work selected by the operator.

If the operator selects registration with the registration button 94 in step S1203, the process advances to step S1204. In step S1204, the color setting editing window described with reference to FIGS. 10A and 10B appears in the form of new registration, and the operator executes registration. Upon completion of registration, the color setting editing unit 30 adds the registration contents to the temporary color setting information storage 30A, and the process advances to step S1208.

If the operator selects deletion with the delete button 96 in step S1203, the process advances to step S1205. In step S1205, the color setting editing unit 30 deletes color setting information alternatively selected by the operator from the color setting list display column 93. In the embodiment, information representing the deletion instruction is associated with a color setting name stored in the temporary color setting information storage 30A. Upon completion of deletion, the process advances to step S1208.

If the operator selects editing with the edit button 95 in step S1203, the process advances to step S1206. In step S1206, the color setting editing unit 30 requests the color setting manager 17 to acquire the data item 52 corresponding to color setting information alternatively selected by the operator from the color setting list display column 93. The color setting editing unit 30 receives the requested data item 52. In step S1207, the color setting editing unit 30 displays the color setting editing windows 101 and 102 described with reference to FIGS. 10A and 10B together with the contents of the data item 52 acquired in step S1206. The operator edits the color setting information via the color setting editing window. Upon completion of editing, the color setting editing unit 30 stores the editing results in the temporary color setting information storage 30A. At the same time, the color setting editing unit 30 associates the edited color setting name with information representing that editing has been done. Then, the process advances to step S1208.

In step S1208, the color setting editing unit 30 refers to color setting names stored in the temporary color setting information storage 30A, and creates again a color setting list reflecting newly registered and deleted color settings. After that, the process returns to step S1202 to set the re-created color setting list in the color setting list display column 93 and display the color setting window 91.

The process in steps S1202 to S1208 is repetitively executed until the operator completes desired color setting information maintenance.

When the process returns to step S1203, and the operator completes desired editing and selects the end of the process with the OK button 97, the process advances to step S1209. In step S1209, the color setting editing unit 30 requests the color setting manager 17 to reflect the maintenance results. Upon receiving the process completion notification in response to the request, the process ends.

In FIG. 12, if the operator cancels editing with the cancel button 98, the process by the color setting editing unit 30 ends without executing step S1209. This is not described in the flowchart.

(Acquisition of Initial Information: Sequence Example in S1201)

Figure 13:
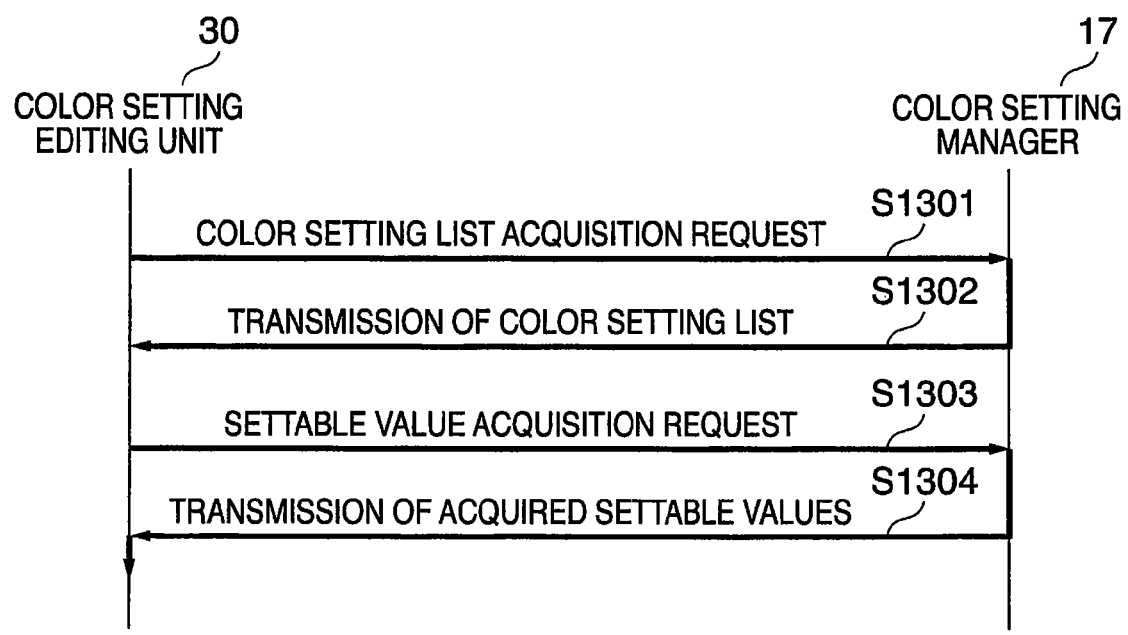
FIG. 13 is a sequence chart for explaining a process in step S1201 to acquire a color setting list and settable values according to the embodiment of the present invention.

Details of the process in the above-described step S1201 to acquire a color setting list and settable values from the color setting manager 17 by the color setting editing unit 30 will be described with reference to FIG. 13.

In step S1301, the color setting editing unit 30 in client A issues a color setting list acquisition request. The acquisition request reaches the color setting manager 17 via the network I/F 10A and the network I/F 10 of the front-end server 1 connected to the network 3. In step S1302, upon receiving the acquisition request, the color setting manager 17 in the front-end server 1 collects color setting names from the color setting name field 501 in accordance with color settings stored in the color setting storage 17A. The color setting manager 17 creates a color setting list, and transmits it to the color setting editing unit 30.

Upon receiving the color setting list from the color setting manager 17, the color setting editing unit 30 issues a settable value acquisition request to the color setting manager 17 in step S1303 in order to acquire values settable in the data items 52 of color setting information. In step S1304, upon receiving the acquisition request, the color setting manager 17 acquires the settable values stored in the color setting storage 17A, and transmits them to the color setting editing unit 30.

Upon receiving the transmitted settable values, the color setting editing unit 30 stores, in the temporary color setting information storage 30A, the color setting list received in step S1302 and the settable values received in step S1304.

(Acquisition of Color Setting Details: Sequence Example in S1206)

Figure 14:
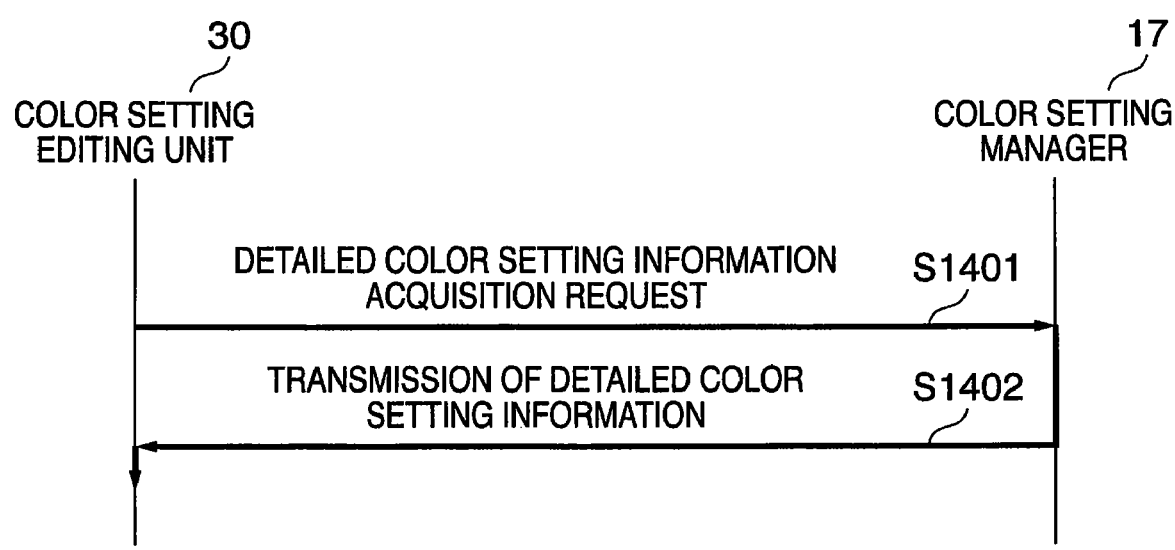
FIG. 14 is a sequence chart for explaining a process in step S1206 to acquire the setting value of each data item 52 of color setting information to be edited according to the embodiment of the present invention.

Details of the process in step S1206 to acquire, from the color setting manager 17 by the color setting editing unit 30, the setting values of the data items 52 of color setting information to be edited will be described with reference to FIG. 14.

In step S1401, the color setting editing unit 30 in client A issues a request to acquire the setting values of the data items 52 together with a data setting name to be edited, as detailed information of color setting information alternatively selected as an editing target by the operator. The acquisition request reaches the color setting manager 17 via the network I/F 10A and the network I/F 10 of the front-end server 1 connected to the network 3. In step S1402, upon receiving the acquisition request, the color setting manager 17 in the front-end server 1 acquires the data items 52 of the color setting information stored in the color setting storage 17A, and transmits them to the color setting editing unit 30. The data items 52 are those of color setting information having a color setting name which coincides with the color setting name transmitted from the color setting editing unit 30 and is described in the color setting name field 501 stored in the color setting storage 17A. The color setting editing unit 30 receives the transmitted data items 52, and stores them in the temporary color setting information storage 30A.

(Reflection in Color Setting Manager: Sequence Example in S1209)

Figure 15:
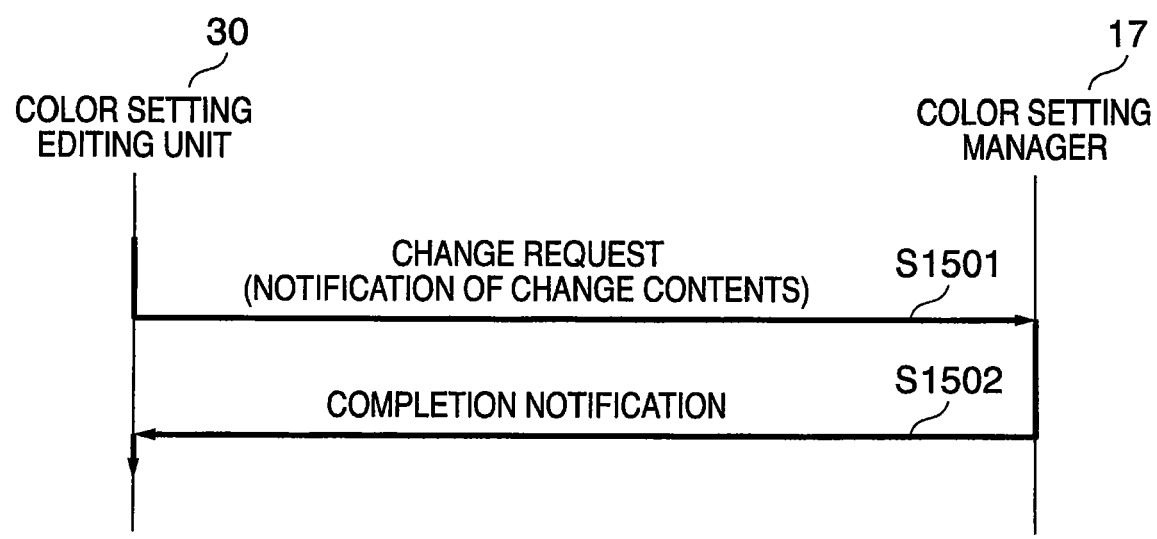
FIG. 15 is a sequence chart for explaining a process in step S1209 to request reflection of a maintenance result and receive a process completion notification according to the embodiment of the present invention.

Details of the process in step S1209 to request the color setting manager 17 to reflect a maintenance result, and receive a process completion notification will be described with reference to FIG. 15.

In step S1501, the color setting editing unit 30 in client A issues a setting change request in order to reflect, in the color setting manager 17, the result of deleting, newly registering, or editing color setting information temporarily stored in the temporary color setting information storage 30A. The color setting editing unit 30 transmits a color setting name as for deleted color setting information, and transmits data items in addition to a color setting name as for newly registered or edited color setting information. The setting change request reaches the color setting manager 17 via the network I/F 10A and the network I/F 10 of the front-end server 1 connected to the network 3.

In step S1502, upon receiving the setting change request, the color setting manager 17 in the front-end server 1 stores newly registered color setting information as new color setting information in the color setting storage 17A. As for edited color setting information, the color setting manager 17 searches the color setting storage 17A for color setting information to be changed, and rewrites the change portion. As for deleted color setting information, the color setting manager 17 searches the color setting storage 17A for the color setting name field 501 subjected to deletion, and deletes color setting information corresponding to the color setting name field 501.

Upon completion of new registration, editing, or deletion requested by the color setting editing unit 30, the color setting manager 17 transmits a completion notification to the color setting editing unit 30 in client A. The color setting editing unit 30 receives the completion notification, and the process ends.

Registration, deletion, and editing of color setting information have been described with reference to FIGS. 9 to 15. By these processes, color settings which are stored in the color setting storage 17A of the front-end server 1 and managed by the color setting manager 17 can be maintained.

<Color Setting Operation Examples by Hot Folder Manager>

An operation to acquire, by a host folder or printer driver, color setting information managed by the color setting manager 17, and output a job to which color matching based on the acquired color setting information is applied will be explained.

Association of color setting information with a hot folder will be explained.

In the embodiment, job data is prepared by assigning a job ticket containing color setting information to a job data file input to the hot folder manager 11C in the front-end server 1. For this purpose, proper color setting information must be selected from pieces of color setting information managed by the color setting manager 17, and stored in the color setting information manager 11F to manage the selected color setting information and hot folder in association with each other. In the embodiment, the same color setting can be associated with a plurality of hot folders. One hot folder is associated with one color setting.

(Example of Hot Folder Setting Window)

Figure 16:
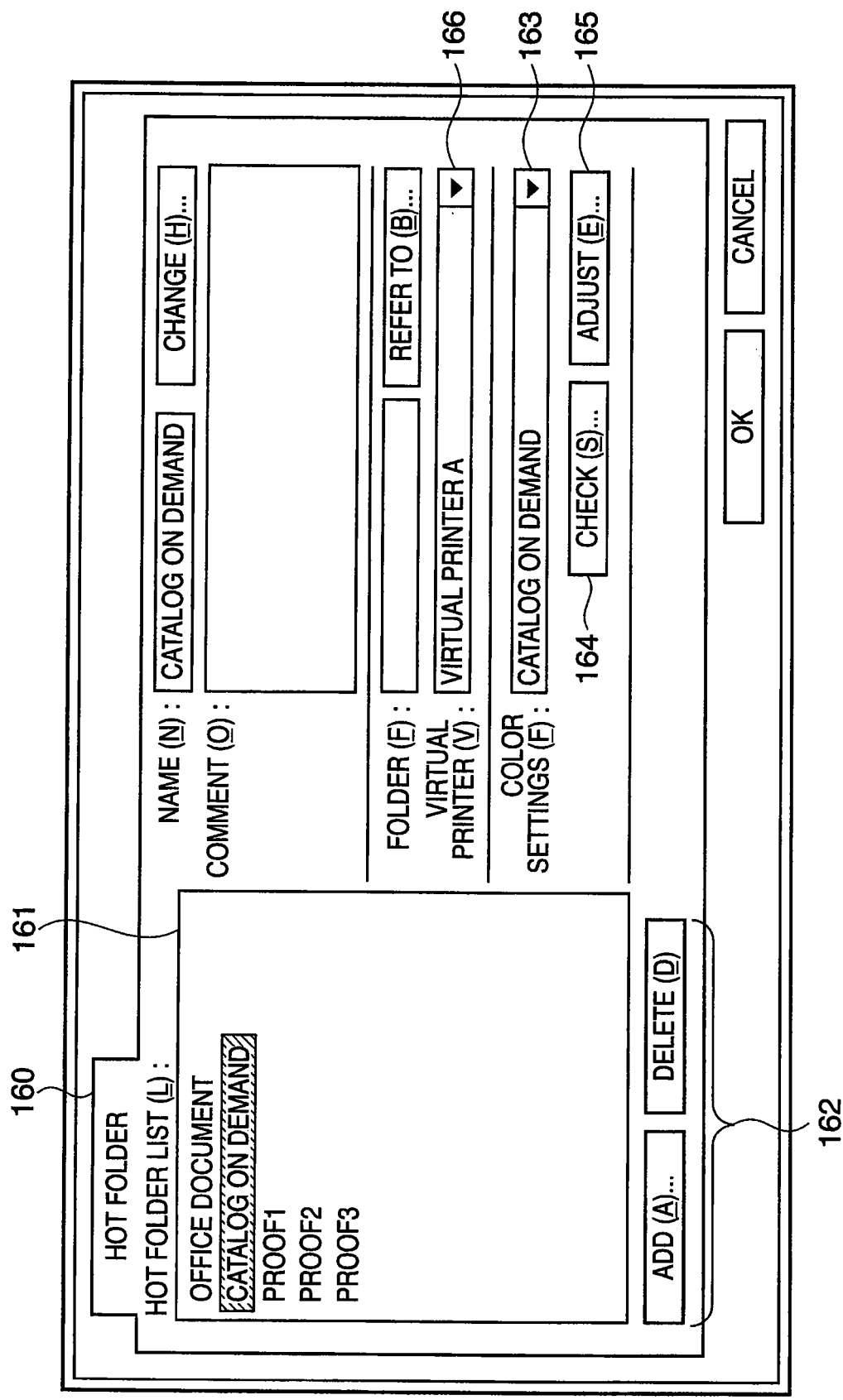
FIG. 16 is a view showing a display example of a hot folder setting window according to the embodiment of the present invention.

FIG. 16 shows a display example of a hot folder setting window 160 for storing color setting information in the color setting information manager 11F in association with a hot folder. The hot folder manager 11C displays the hot folder setting window 160. The hot folder setting window 160 allows the operator to, for example, select color settings, select a destination printer engine 2, and newly create or delete a hot folder. As the printer engine 2, a virtual printer is selected. In FIG. 16, items unnecessary for a description of the embodiment are not illustrated.

In FIG. 16, the hot folder setting window 160 is a display example. A hot folder selection column 161 is created by the front-end server 1 and displays a list of active hot folders.

When newly creating or deleting a hot folder, the operator uses a hot folder management button group 162.

A color setting selection column 163 displays the color setting name of a hot folder alternatively selected in the hot folder selection column 161. The initial display is a color setting information name associated with the alternatively selected hot folder. At this time, when color setting information associated with the alternatively selected hot folder has been edited and is not managed by the color setting manager 17, the color setting name is "separate settings".

A color setting content check button 164 is used to display a setting content check window for color setting information selected in the color setting selection column 163. A color setting adjustment button 165 is used to display an adjustment window for adjusting the setting contents of color setting information selected in the color setting selection column 163. The adjustment window has a window display as shown FIGS. 10A and 10B, and the operator can change the setting of each data item via this window. The color setting manager 17 does not manage color setting information edited via the adjustment window. Hence, the color setting name described in the job ticket is "separate settings".

A virtual printer selection column 166 is used to acquire a virtual printer list managed by the printer manager 15 and alternatively select a destination virtual printer based on the acquisition result.

(Sequence Example of Associating Hot Folder with Color Setting)

A process sequence to store a color setting in the color setting information manager 11F in association with a hot folder managed by the hot folder manager 11C will be described with reference to the flowchart of FIG. 17.

Figure 17:
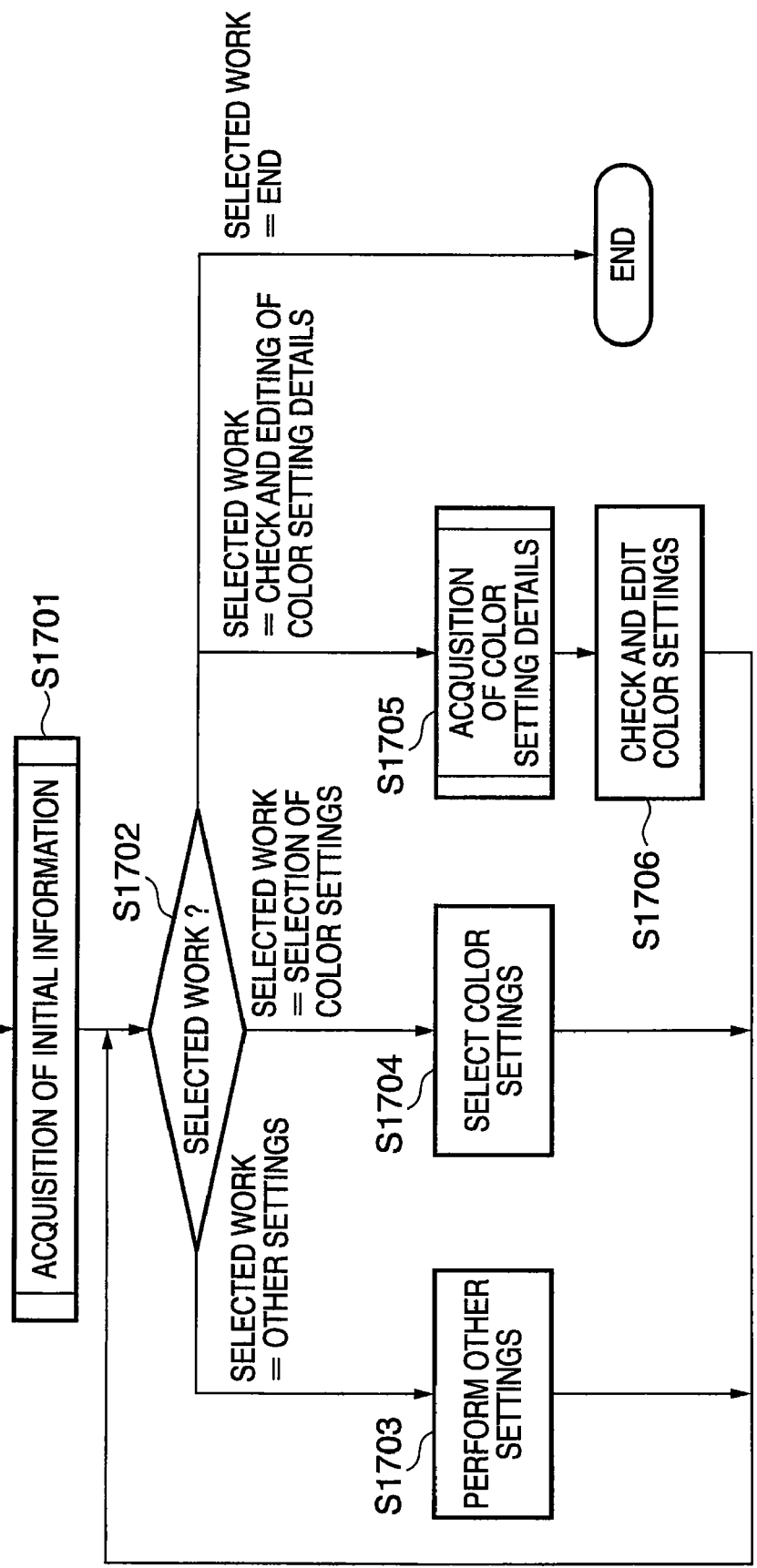
FIG. 17 is a flowchart for explaining a process sequence to store color settings in association with a hot folder according to the embodiment of the present invention.

In step S1701 of FIG. 17, an initial process is done before the start of displaying the hot folder setting window 160. This process is the same as the initial process in step S1201 described with reference to FIG. 12 for the color setting manager 17. More specifically, a request is issued to acquire a color setting list of color setting names described in the color setting name field 501 for color settings and values settable in the data items 52 of color setting information. The color setting list and settable values are acquired as a result of the acquisition request, and then stored in the setting information manager 11E. A virtual printer list is acquired from the printer manager 15 and set in the virtual printer selection column 166.

In this step, the process is complete within the front-end server 1, and no communication is done via the network I/F.

After acquiring the initial information, a color setting name described in the color setting list is set in the color setting selection column 163. If the color setting information manager 11F holds edited color setting information, the hot folder setting window 160 is displayed together with "separate settings".

In step S1702, the process waits for a work selection instruction from the operator, and branches in accordance with work selected by the operator.

In step S1702, if the operator operates the hot folder management button group 162 in the hot folder setting window 160 or requests other settings including a paper setting (not shown), the process advances to step S1703. In step S1703, settings other than color setting information are made, and the process returns to step S1702. If the operator selects a destination virtual printer from the virtual printer selection column 166 in step S1703, the setting information manager 11E stores the selected virtual printer.

After the process returns to step S1702, if the operator changes selection of the color setting name in the color setting selection column 163 while alternatively selecting a hot folder from the hot folder selection column 161, the process advances to step S1704. In step S1704, the color setting name which is stored in the color setting information manager 11F and associated with the hot folder alternatively selected in step S1702 is replaced with the color setting name changed in the color setting selection column 163. If the color setting information has been edited in step S1706, that is, the color setting name is "separate settings", the data items of the color setting information stored in the color setting information manager 11F are also deleted. If, for example, a hot folder is newly created in step S1703 and is not associated with any color setting, color setting information can be associated with the hot folder by executing step S1704. After the end of the process in step S1704, the process returns to step S1702.

After the process returns to step S1702, if the operator designates check or editing of color settings with the color setting content check button 164 or color setting adjustment button 165 while alternatively selecting a hot folder from the hot folder selection column 161, the process advances to step S1705. In step S1705, a color setting name stored in the hot folder manager 11C and color setting information manager 11F in correspondence with the alternatively selected hot folder is acquired. The color setting manager 17 is requested to acquire the data items of color setting information corresponding to the color setting name. The data items are then received as a result of the request. In step S1705, the color setting manager 17 is requested to acquire detailed color setting information from the hot folder manager 11C. The data items are then received as a result of the request. If the color setting name associated with the alternatively selected hot folder is "separate settings", the data items of color setting information are read out from the color setting information manager 11F.

In step S1706, a window identical to the color setting name editing windows 101 and 102 described with reference to FIGS. 10A and 10B is displayed together with the contents of the data items acquired in step S1705. In step S1702, if the operator designates detailed check of color setting information with the color setting content check button 164, the color setting information is displayed in a state in which it cannot be changed. The operator checks or edits the color setting information. If the operator edits the color setting information, the color setting information manager 11F stores the editing result, and the color setting name field 501 changes to "separate settings". The window displayed in step S1706 is closed, and the process returns to step S1702.

In step S1702, if the operator designates the end of setting a hot folder, the process ends. Consequently, association of a hot folder managed by the hot folder manager 11C with color setting information is complete.

<Example of Inputting Job Data to Hot Folder by Print Data Creation/editing Unit 42>

Figure 18:
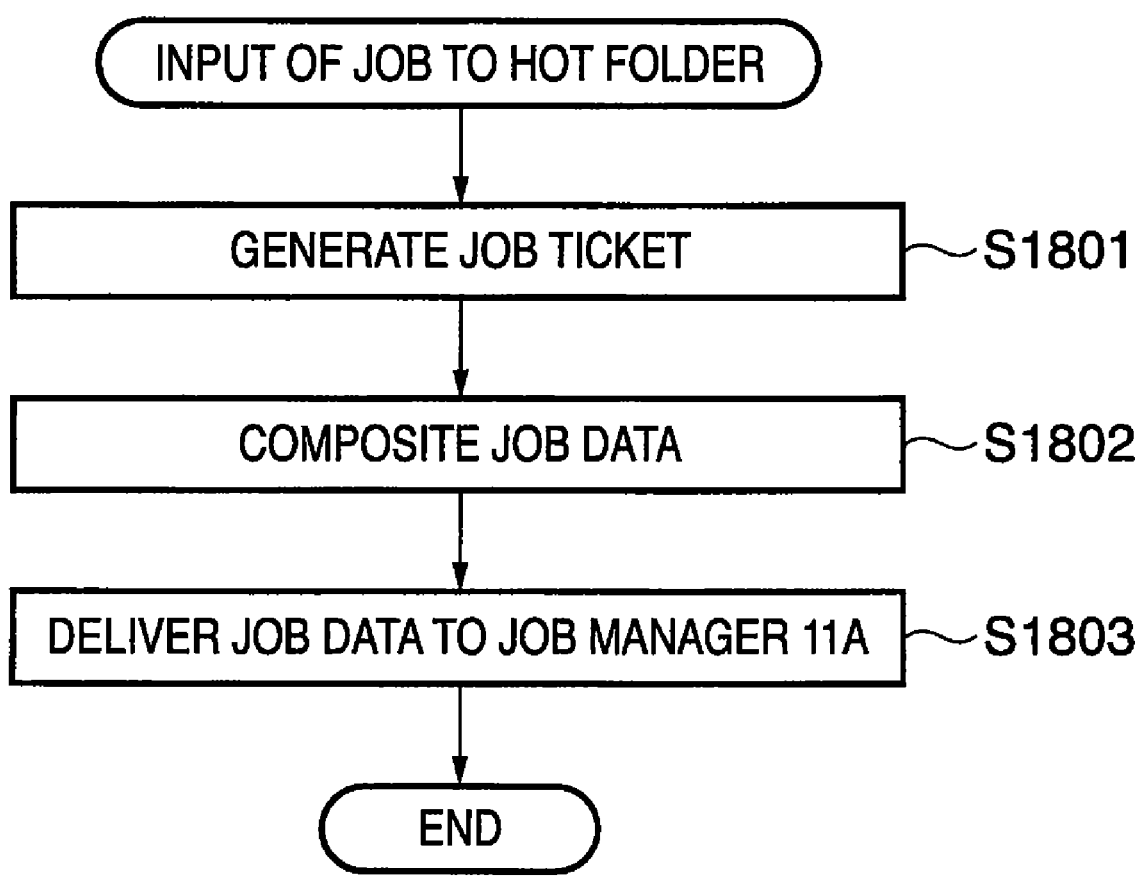
FIG. 18 is a flowchart for explaining a process to, after inputting a job data file to a hot folder, composite job data and deliver it to a job manager according to the embodiment of the present invention.

A sequence example after the print data creation/editing unit 42 in client C inputs a job data file to a hot folder managed by the hot folder manager 11C in the front-end server 1 will be described with reference to FIG. 18. Upon receiving a job data file, the hot folder manager 11C composites it as job data, and delivers it to the job manager 11A.

In step S1801, the hot folder manager 11C acquires information associated with the job data file-input hot folder from the setting information manager 11E and color setting information manager 11F. Subsequently, the hot folder manager 11C requests the job ticket generation/editing unit 11D to generate a job ticket based on the acquired information, and receives the job ticket as a result of the request.

In step S1802, the hot folder manager 11C composites the received job data file with the job ticket generated in step S1801 into job data as shown in FIGS. 8A and 8B.

In step S1803, the hot folder manager 11C delivers the job data to the job manager 11A. The job manager 11A manages the job in preparation for printing.

The process until a job data file input from client C is delivered to the job manager 11A as job data containing color settings managed by the color setting manager 17 has been described.

<Example of Creating and Inputting Job Data by Printer Driver 40>

A process to create job data containing color setting information by the printer driver 40 in client B and input a job to the front-end server 1 will be explained with reference to FIGS. 19 and 20. The color setting information is acquired from pieces of color setting information managed by the color setting manager 17 in the front-end server 1.

The document creation application 41 in client B activates the printer driver 40. The printer driver 40 creates and transmits job data in order to print a document created or read using the document creation application 41.

(Display Example of Print Quality Window)

FIG. 19 is a view showing a display example of a print quality setting window for making color settings and the like, out of windows displayed by the printer driver 40. In the following description, points unnecessary for a description of the embodiment will be omitted.

In FIG. 19, reference numeral 190 denotes a print quality setting window. A color setting selection column 191 is used to select color settings for job data to be printed, similar to the color setting selection column 163 described with reference to FIG. 16. As color settings displayed in the color setting selection column 191, the color setting name field 501 managed by the color setting manager 17 is set as a selection value. When color setting information has been edited, the color setting selection column 191 shows "separate settings" representing that the color settings have been edited.

A color setting adjustment button 192 is used to display an adjustment window for adjusting the setting contents of color settings. The adjustment window has a window display as shown FIGS. 10A and 10B, and the operator can change the setting of each data item 52 via this window. The color setting manager 17 does not manage color settings adjusted in the adjustment window. A color setting check button 193 is used to display a setting content check window for selected color settings.

By giving an instruction with an output start button 194, a designated document is converted into PDL, and job ticket data is created with settings necessary for printing, including color settings and settings (not shown). The job ticket data and job data are composited to input the job to the front-end server 1.

(Sequence Example of Creating and Transmitting Job Data)

Figure 20:
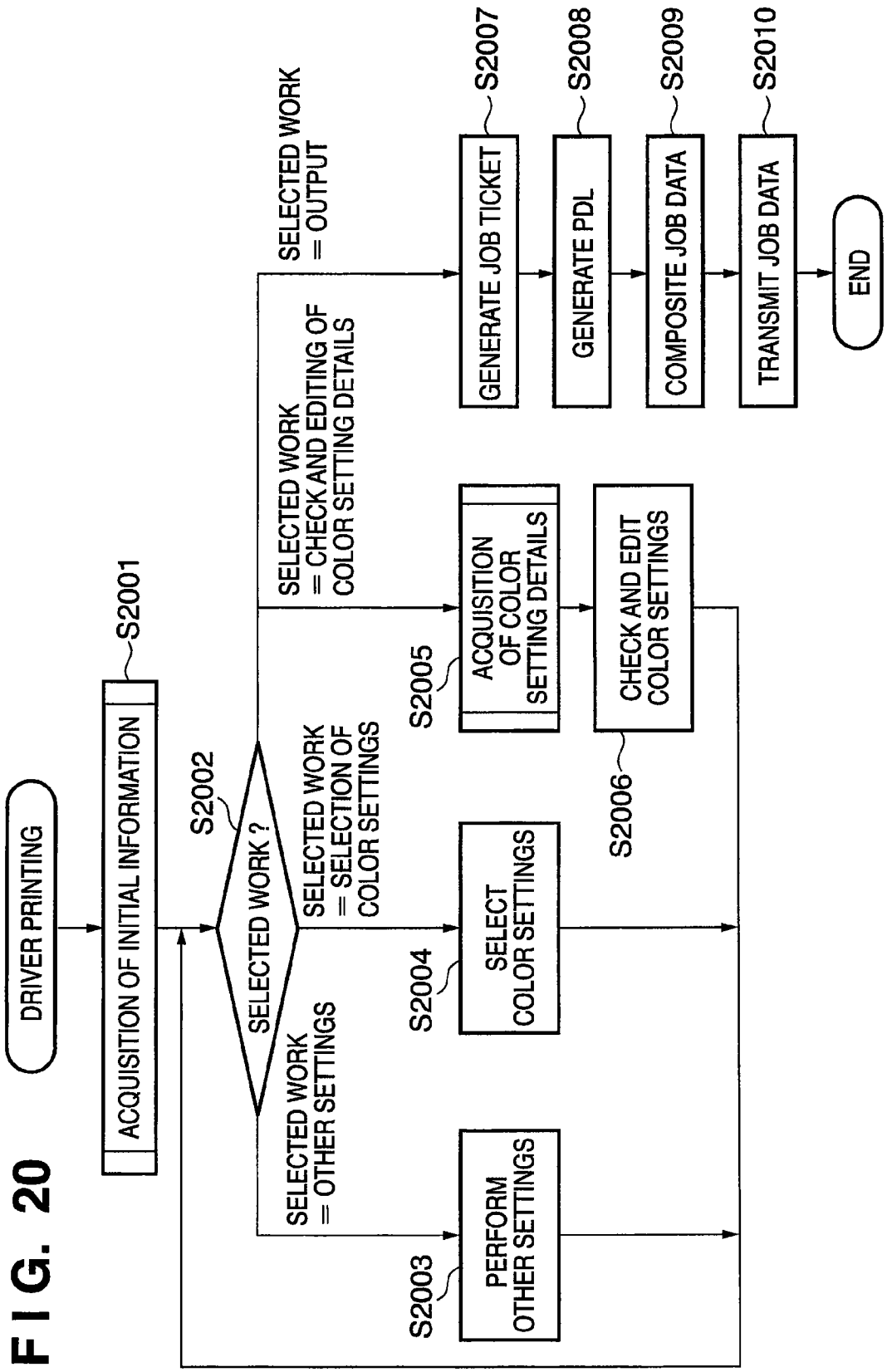
FIG. 20 is a flowchart for explaining a process to create a print job using a printer driver 40 and transmit it to the front-end server 1 according to the embodiment of the present invention.

FIG. 20 is a flowchart until a print job is created using the printer driver 40 and transmitted to the front-end server 1 in order to print a document created by the document creation application 41. The print quality setting window 190 allows the operator to set the print resolution in addition to color settings. Although printing further requires settings such as paper type and the number of copies, these settings have been made in a description of FIG. 20. Also, a destination virtual printer has already been selected and stored in the setting information manager 40C.

In step S2001 of FIG. 20, an initial process is done before the start of displaying the print quality setting window 190. This process is the same as the initial process in step S1201 described with reference to FIG. 12 for the color setting manager 17. More specifically, a request is issued via the network I/F 10C to acquire a color setting list of color setting names described in the color setting name field 501 and values settable in the data items of color setting information. The color setting list and settable values are acquired as a result of the acquisition request, and then stored in the setting information manager 40C.

After acquiring the initial information, a color setting name described in the color setting list is set in the color setting selection column 191 and displayed in the print quality setting window 190. Then, the process advances to step S2002. In step S2002, the process waits for a work selection instruction from the operator, and branches in accordance with work selected by the operator.

In step S2002, if the operator has changed the print resolution setting, a setting other than color settings has been made, and the process advances to step S2003. In step S2003, the change of the print resolution is accepted to store the setting value in the setting information manager 40C. Thereafter, the process returns to step S2002.

After the process returns to step S2002, if the operator has changed color settings in the color setting selection column 191, the process advances to step S2004. In step S2004, the color setting information manager 40D stores the color setting name selected in step S2002, and the process returns to step S2002.

After the process returns to step S2002, if the operator designates check or editing of color settings with the color setting adjustment button 192 or color setting check button 193, the process advances to step S2005. In step S2005, the color setting name stored in the color setting information manager 40D in step S2004 is acquired. The color setting manager 17 is requested to acquire the data items of color setting information corresponding to the color setting name. The data items are then received as a result of the request. Step S2004 is the same as acquisition of color setting details described with reference to FIG. 14. The printer driver 40 transmits the color setting name, and requests the color setting manager 17 in the front-end server 1 via the network I/F 10C to acquire detailed color setting information. The printer driver 40 receives the process result to the request. If the color setting name associated with the alternatively selected hot folder is "separate settings", the data items are read out from the color setting information manager 11F.

In step S2006, a window identical to the color setting name editing windows 101 and 102 described with reference to FIGS. 10A and 10B is displayed together with the contents of the data items 52 acquired in step S2005. In step S2002, if the operator designates detailed check of color settings with the color setting check button 193, the color settings are displayed in a state in which they cannot be changed. The operator checks or edits the color setting information. If the operator has edited the color setting information, the color setting information manager 40D stores the editing result, and the color setting name field 501 stored in the color setting information manager 40D changes to "separate settings". Further, the display contents of the color setting selection column 191 also change. The window displayed in step S2006 is closed, and the process returns to step S2002.

In step S2002, if the operator issues an instruction with the output start button 194, the process advances to step S2007 in order to start the output process. In step S2007, the settings of the job are read out from the setting information manager 40C and color setting information manager 40D. The job ticket generator 40A is requested to create a job ticket. Upon receiving the process result, the process advances to step S2008. If the color setting name is "separate settings" in generating a job ticket with color settings, it is described in the job ticket including detailed settings. If the operator has not edited any data item of color setting information corresponding to the color setting name, only the color setting name is described.

In step S2008, the PDL generator 40B is used to generate PDL from a document held by the document creation application 41. In step 32009, the job ticket generated in step S2007 and the PDL generated in step S2008 are composited into job data. In step S2010, the job data is transmitted to the job controller 11 of the front-end server 1 via the network I/F 10C.

Upon receiving the job data, the job manager 11A in the job controller 11 manages the job in preparation for printing.

The process until client B delivers job data containing color settings managed by the color setting manager 17 to the job manager 11A in order to print a document created by the document creation application 41 has been described.

<Operation Examples of Print Process and Change of Color Settings for Job Data>

Change of color settings for job data which is created by the hot folder manager 11C or printer driver 40 and managed by the job manager 11A, and a print process will be described.

(Example of Print Job Management Window)

Figure 21:
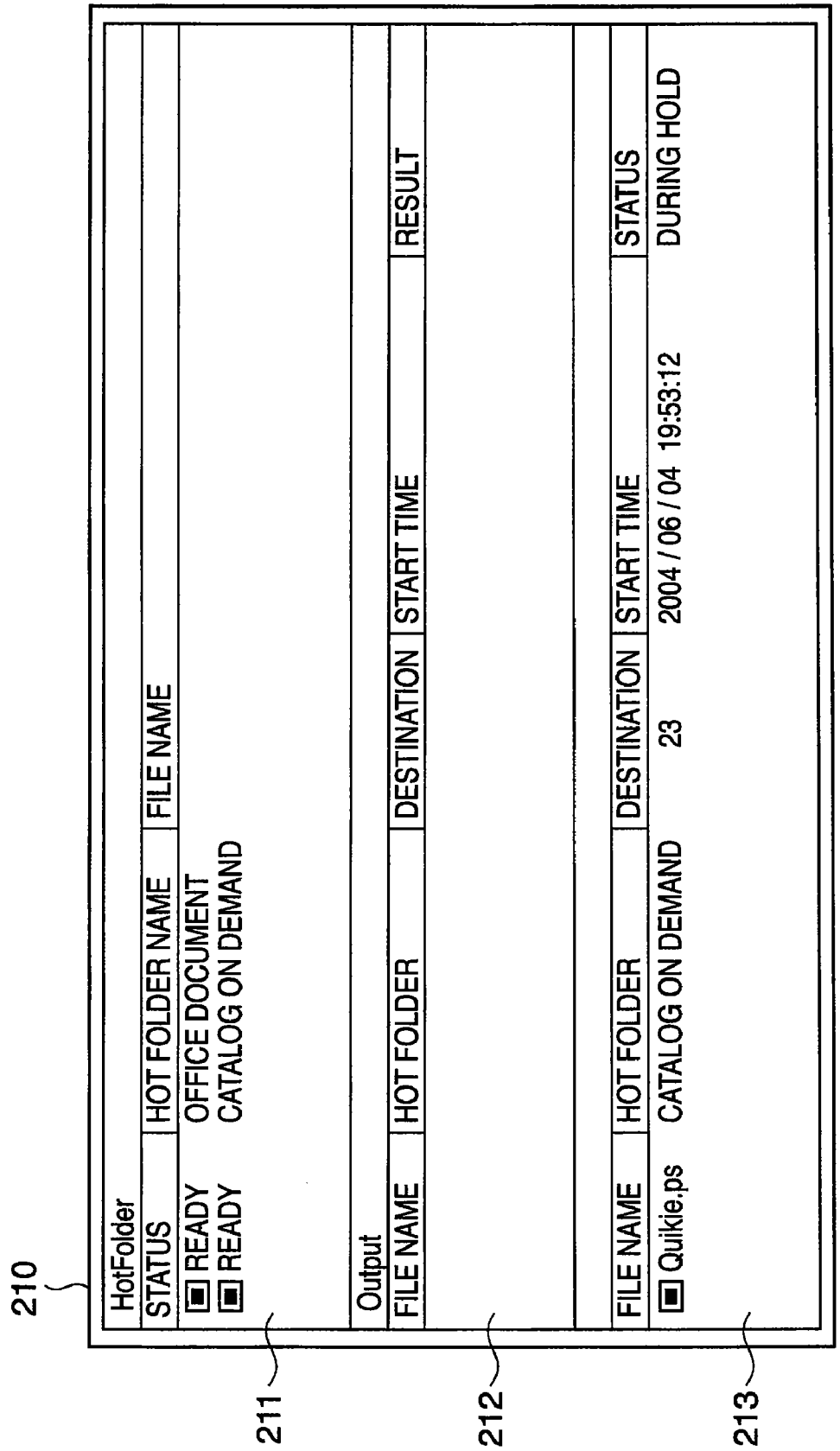
FIG. 21 is a view showing a job management window according to the embodiment of the present invention.

A job management window displayed by the job controller 11 will be explained with reference to FIG. 21.

A job management window 210 has a hot folder display column 211, a printed job display column 212, and a held job display column 213 which displays jobs held in the job manager 11A.

The hot folder display column 211 displays a list of hot folders managed by the hot folder manager 11C. The printed job display column 212 displays a list of job data which are managed by the job manager 11A and have already been printed. The held job display column 213 displays a list of jobs (held jobs) which are managed by the job manager 11A and wait for the start of printing. The held job display column 213 displays, as a held job, a job created by the hot folder manager 11C or printer driver 40.

<Sequence Example of Job Data Print Process>

A held job print process will be explained with reference to the flowchart of FIG. 22. The flowchart in FIG. 22 starts when the job controller 11 controls a print job input from the hot folder manager 11C or printer driver 40 and the job manager 11A temporarily holds the job data.

In step S2201, the operator alternatively selects a held job and designates work. In step S2202, the process branches in accordance with the work designation.

Figure 23:
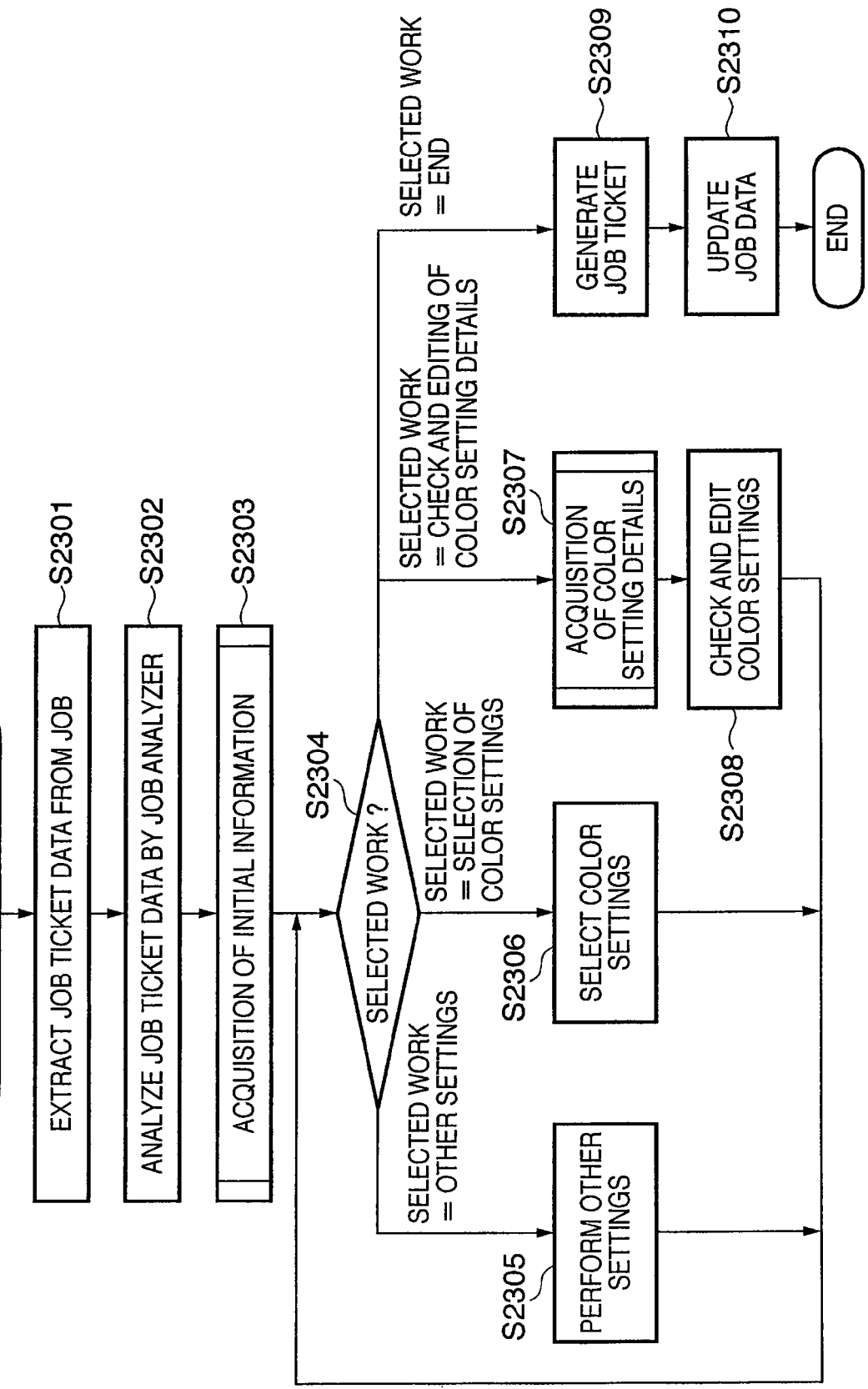
FIG. 23 is a flowchart for explaining a job color setting change process in step S2202 according to the embodiment of the present invention.

If the work designation is change of job settings, the process advances to step S2203; if it is printing, to step S2204. In step S2203, the print condition settings of the alternatively selected job data are changed. The color setting change process in step S2203 will be described with reference to FIG. 23.

In step S2204, only job ticket data is extracted from the job data, and the process advances to step S2205. In step S2205, the job analyzer 11B analyzes the job ticket data, and the process advances to step S2206. In step S2206, output paper type information in the job ticket data of FIGS. 8A and 8B is set to Info_media, and the process advances to step S2207. In step S2207, the job data is output, and the process ends. Details of the job data output will be described later with reference to FIG. 24.

(Change of Job Settings: Color Setting Change Process Sequence in S2203)

When changing the print conditions of a held job, the settings are changed in step S2203 described above. Details of step S2203 will be described with reference to FIG. 23. For a concise description of the embodiment, only change of color settings will be explained. The flowchart in FIG. 23 starts when the operator alternatively selects a job in step S2201 and designates change of settings in step S2202.

In changing settings, the job controller 11 displays a window having the same items as those of the print quality setting window 190 described with reference to FIG. 19. In the embodiment, the settings of a destination virtual printer are not changed. However, the embodiment can also be achieved by an arrangement capable of changing the settings of a destination virtual printer in changing job settings. The flowchart of FIG. 23 will be explained with reference to FIG. 19 for descriptive convenience.

In step S2301, only job ticket data is extracted from job data, and the process advances to step S2302. In step S2302, the job analyzer 11B analyzes the job ticket data to store the analysis result. Then, the process advances to step S2303.

Step S2303 is the same as the initial process in step S1201 described with reference to FIG. 12 for the color setting manager 17. More specifically, a request is issued to acquire a color setting list of color setting names described of color setting information and values settable in the data items. The color setting list and settable values are acquired as a result of the acquisition request. After acquiring the initial information, the color setting name field 501 described in the color setting list is set in the color setting selection column 191. In setting, a color setting name as a result of analyzing the job ticket is set as an initial value. Thereafter, the print quality setting window 190 is displayed, and the process advances to step S2304.

In step S2304, the process waits for a work selection instruction from the operator, and branches in accordance with work selected by the operator.

In step S2304, if the operator has changed the print resolution setting, the process advances to step S2305. In step S2305, the change of the print resolution is accepted to change the job ticket analysis result in step S2302. Then, the process returns to step S2304.

After the process returns to step S2304, if the operator has changed color settings in the color setting selection column 191, the process advances to step S2306. In step S2306, the color setting name as a result of analyzing the job ticket in step S2302 is changed to the color setting name selected in step S2304. After that, the process returns to step S2304. If the job ticket holds "separate settings", detailed data items are described in addition to the color setting name, and thus erased.

After the process returns to step S2304, if the operator designates check or editing of color settings with the color setting adjustment button 192 or color setting check button 193, the process advances to step S2307. In step S2307, the color setting name described in the job ticket is acquired. The color setting manager 17 is requested to acquire the data items of color setting information corresponding to the color setting name. The data items are then received as a result of the request. If the color setting name described in the job ticket is "separate settings", the data items of color setting information are read out from the color setting information manager 11F.

In step S2308, a window identical to the color setting name editing windows 101 and 102 described with reference to FIGS. 10A and 10B is displayed together with the contents acquired in step S2307. In step S2304, if the operator designates detailed check of color setting information with the color setting check button 193, the color setting information is displayed in a state in which it cannot be changed. The operator checks or edits the color setting information. If the operator has edited the color setting information, the editing result is added to the job ticket analysis result, and the color setting name changes to "separate settings". The window displayed in step S2308 is closed, and the process returns to step S2304.

In step S2304, if the operator issues an instruction with the output start button 194, the process advances to step S2309 in order to start the output process. In this process, the output start instruction is the completion of changing settings. In step S2309, the job ticket generation/editing unit 11D is requested to create a job ticket from the job ticket analysis result changed by the above-mentioned process. Upon receiving the process result, the process advances to step S2310. If the color setting name is "separate settings" in generating a job ticket with color settings, it is described in the job ticket including the data items of the color setting information; otherwise, only the color setting name is described. In step S2310, the job ticket in the job data is updated to the job ticket created in step S2309.

(Detailed Sequence Example of Outputting Job Data)

Figure 24:
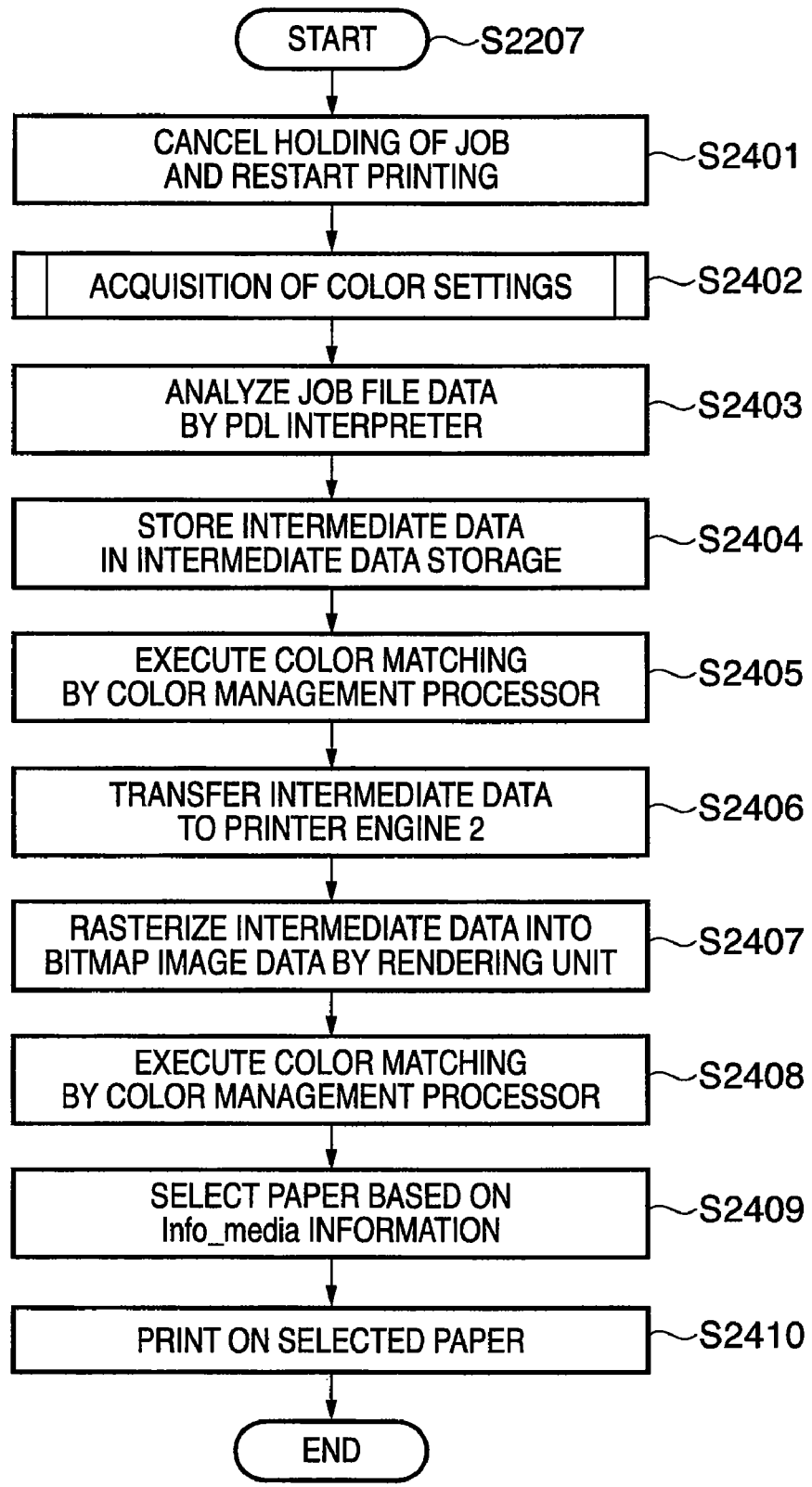
FIG. 24 is a flowchart for explaining a detailed process of job data output in step S2207 according to the embodiment of the present invention.

FIG. 24 is a flowchart showing a detailed process in step S2207.

In step S2401, the process of a job file held in the job manager 11A restarts, and the process advances to step S2402.

Figure 22:
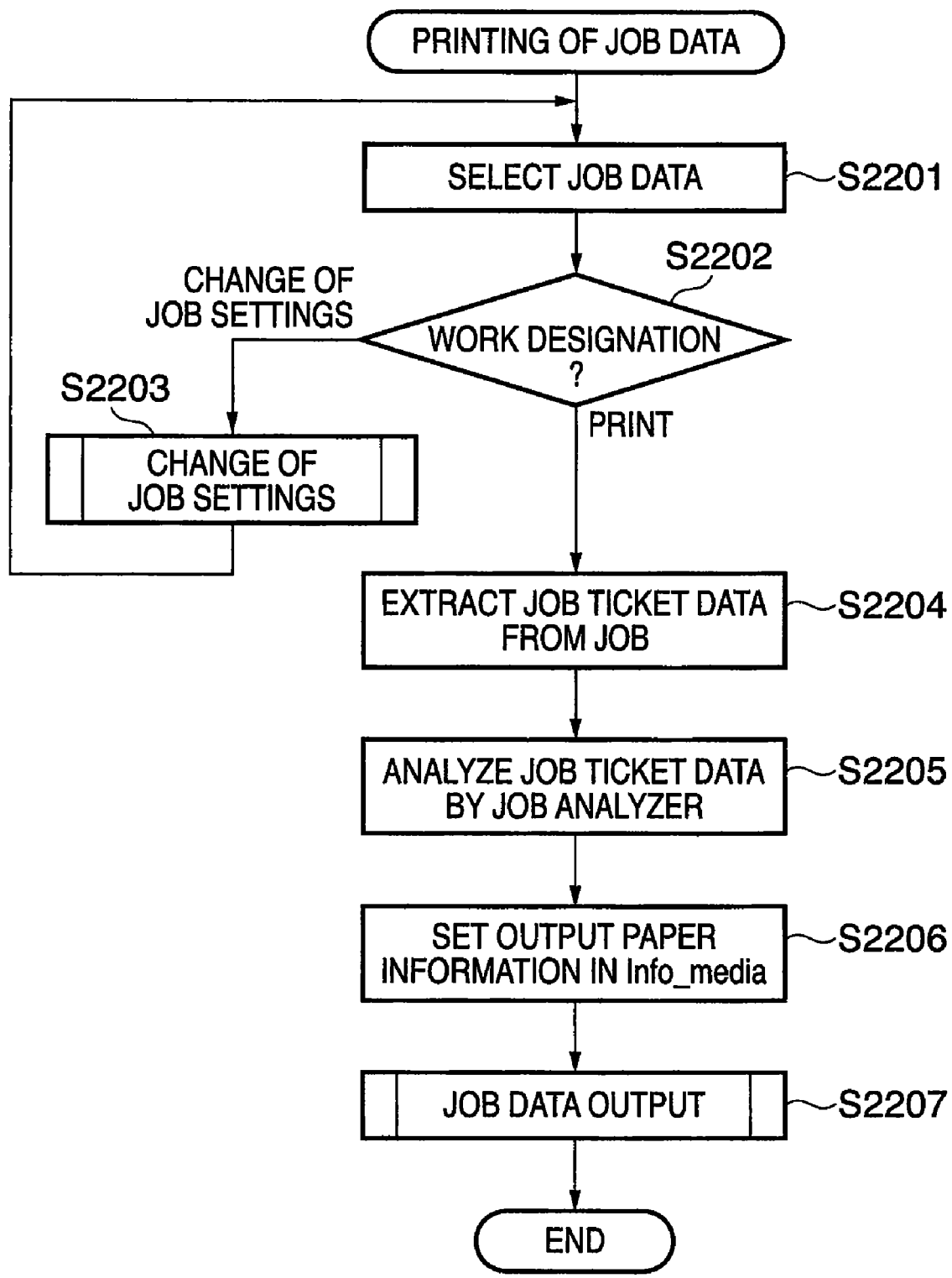
FIG. 22 is a flowchart for explaining a held job print process according to the embodiment of the present invention.

In step S2402, detailed information of color settings is acquired from the color setting manager 17 in accordance with the job ticket analysis result in step S2205 of FIG. 22. Details of step S2402 will be described later with reference to FIG. 25.

In step S2403, the PDL interpreter 12 analyzes job file data to generate intermediate data, and the process advances to step S2404. In step S2404, the intermediate data storage 13 stores the intermediate data generated in step S2403, and the process advances to step S2405. In step S2405, the color management processor 16 executes a color matching process for the intermediate data stored in the intermediate data storage 13 by using a profile described in the color settings of the job ticket analysis result. The color matching process adopts a normal sequence to perform a color matching process for RGB or CMYK data, and uses an RGB or CMYK target profile and a reference profile. Thereafter, the process advances to step S2406.

In step S2406, the intermediate data stored in the intermediate data storage 13, the profiles, and detailed information of color settings are transmitted to the printer engines 2 which form a destination virtual printer described in the job ticket. The printer engines are obtained from the virtual printer by inquiring them of the printer manager 15. In step S2407, the rendering unit 22 in the printer engine 2 rasterizes the data into bitmap image data, and the process advances to step S2408. In step S2408, the color management processor 23 performs a color matching process for the rasterized bitmap image data in accordance with a profile and detailed information of color settings corresponding to a paper name described in the color settings of the job ticket analysis result in S2402. At this time, color matching is done using a printer profile corresponding to the reference profile and paper name.

In step S2409, paper is selected based on Info_media information, and the process advances to step S2410. In step S2410, data is printed on the selected paper, and the process ends.

By designating a paper name as a color setting, the front-end server analyzes the virtual printer and paper name. As a result of the analysis, each printer engine which forms the virtual printer can perform color matching using a profile corresponding to paper. Thus, it suffices to designate a profile not for each printer engine which forms the virtual printer, but for each virtual printer. Since a profile can be designated by the paper name, color matching can be executed for an image signal representing a printing material (toner or ink) whose limit amount is determined by the paper type.

(Acquisition of Detailed Information of Color Settings: Sequence Example in S2402)

Figure 25:
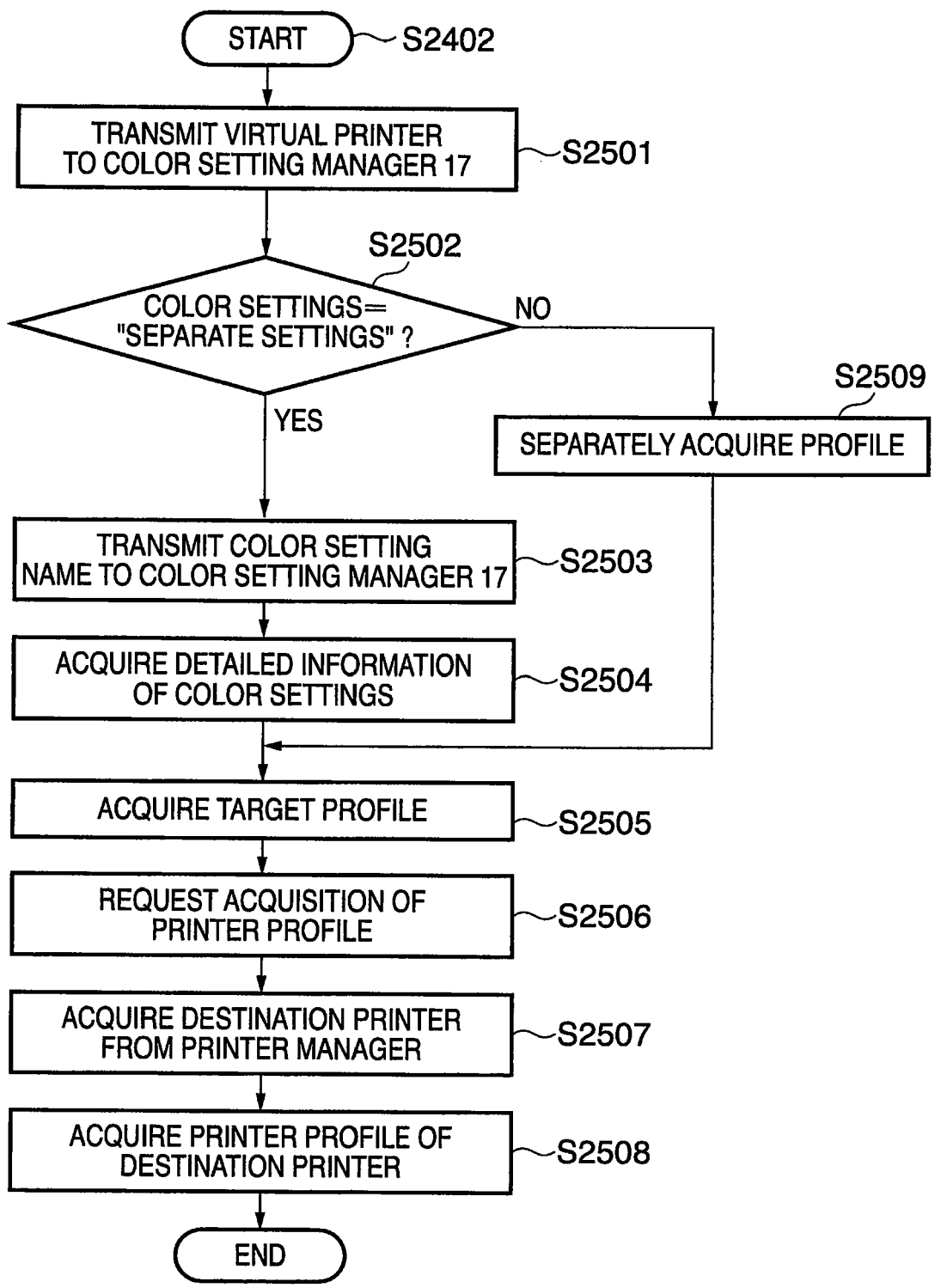
FIG. 25 is a flowchart for explaining a process to acquire detailed information of color settings and a profile from the color setting manager 17 by a job controller 11 according to the embodiment of the present invention.

The process in S2402 to acquire detailed information of color settings and a profile from the color setting manager 17 by the job controller 11 based on the contents of a job ticket analyzed in step S2205 will be described. FIG. 25 is a flowchart showing a detailed sequence example of step S2402.

In step S2501, the job controller 11 notifies the color setting manager 17 of a virtual printer. In step S2502, the job controller 11 determines whether the color setting name is "separate settings". If the color setting name is "separate settings", the process advances to step S2509; if the color setting name is not "separate settings", to step S2503. In step S2503, the job controller 11 notifies the color setting manager 17 of a color setting name. In step S2504, the job controller 11 requests the color setting manager 17 to acquire detailed information of the color settings notified in step S2503. The color setting manager 17 searches for color setting information corresponding to the color setting name, and notifies the job controller 11 of detailed information of the detected color settings. In step S2509, the job controller 11 separately acquires a profile.

In step S2505, the job controller 11 requests the color setting manager 17 to acquire a spot color set, and profiles corresponding to RGB and CMYK target profile names and a spot color set name which are described in the acquired detailed information of color settings. The color setting manager 17 delivers, to the job controller 11, a profile entity associated with the notified profile name or spot color set name.

In step S2506, the job controller 11 requests the color setting manager 17 to acquire a printer profile. In step S2507, the color setting manager 17 acquires, from the printer manager 15, the printer engines 2 which form the virtual printer notified in step S2501. In step S2508, the printer profile 63 is searched for a paper name described in the detailed information of color settings in correspondence with the printer engines 2 obtained in step S2507. The color setting manager 17 acquires a current profile from printer profiles associated with the detected paper name, and delivers it to the job controller 11 in association with the printer engines 2. Each printer engine 2 which forms the virtual printer can execute color matching using the current profile.

According to the embodiment, the printer driver 40 acquires color setting information upon receiving a printing instruction. However, the printer driver 40 can also acquire color setting information at a timing different from the printing instruction.

From the beginning of configuring the system, the hot folder manager 11C and printer driver 40 may hold all or some pieces of color setting information identical to color setting information managed by the color setting manager 17. It is also possible to, at a predetermined timing when, for example, color setting information managed by the color setting manager 17 is updated, acquire or receive the updated color setting information and mirror the management contents in the color setting manager 17.

The present invention may be applied to a system including a plurality of devices (e.g., a host computer, interface device, reader, and printer) or a layout apparatus formed from a single device.

The object of the present invention is also achieved by supplying a storage medium which stores software program codes for implementing the sequences of the flowcharts of the above-described embodiment to a system or apparatus, and reading out and executing the program codes stored in the storage medium by the computer (or the CPU or MPU) of the system or apparatus.

In this case, the program codes read out from the storage medium implement the functions of the above-described embodiment, and the storage medium which stores the program codes constitutes the present invention.

The storage medium for supplying the program codes includes a floppy® disk, hard disk, optical disk, magnetooptical disk, CD-ROM, CD-R, magnetic tape, nonvolatile memory card, and ROM.

The present invention also includes a case where an OS (Operating System) or the like running on the computer performs some or all of actual processes based on the instructions of the program codes read out by the computer and thereby implements the functions of the above-described embodiment.

Furthermore, the present invention includes a case where the functions of the above-described embodiment are implemented as follows. That is, the program codes read out from the storage medium are written in the memory of a function expansion board inserted into the computer or the memory of a function expansion unit connected to the computer. Then, the CPU of the function expansion board or function expansion unit performs some or all of actual processes based on the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-259496 filed on Sep. 25, 2006, which is hereby incorporated by reference herein in its entirety.

What is claimed is:

1. A color print control apparatus comprising:
a printer management unit configured to manage a combination of color printers as a virtual printer;
a color setting management unit configured to register a color profile to each of the color printers combined as the virtual printer, which corresponds to paper name of paper used in the virtual printer;
a first color management unit configured to perform a color matching process for a color space data using a target profile and a reference profile;
a second color management unit configured to perform a color matching process for the color space data performed the color matching process by the first color management unit using the reference profile and the color profile corresponding to the paper name, which is registered to each of the color printers combined as the virtual printer, in order to use, at each of the plurality of the color printers combined as the virtual printer, the color space data performed the color matching process by the second color management unit.

2. The apparatus according to claim 1, wherein said color setting management unit associates single paper with at least one color profile.

3. The apparatus according to claim 2, wherein said color setting management unit manages the color profile, and also manages a color matching rule of said first or second color management unit.

4. The apparatus according to claim 1, wherein said printer management unit includes a printer information change unit configured to change managed virtual printer information, and said color setting management unit includes a color setting information change unit configured to change managed color setting information.

5. A color print control method for a color print control apparatus, comprising:
a printer management step implemented by the color print control apparatus of managing a combination of color printers as a virtual printer;
a color setting management step implemented by the color print control apparatus of registering a color profile to each of the color printers combined as the virtual printer, which corresponds to paper name of paper used in the virtual printer and output paper;
a first color management step implemented by the color print control apparatus of performing a color matching process for a color space data using a target profile and a reference profile;
a second color management step implemented by the color print control apparatus of performing a color matching process for the color space data performed the color matching process in the first color management step using the reference profile and the color profile corresponding to the paper name, which is registered to each of the color printers combined as the virtual printer, in order to use, at each of the plurality of the color printers combined as the virtual printer, the color space data performed the color matching process in the second color management step.

6. The method according to claim 5, wherein in the color setting management step, single paper is associated with at least one color profile.

7. The method according to claim 6, wherein in the color setting management step, the color profile is managed, and in the first or second color management step, a color matching rule is also managed.

8. The method according to claim 5, wherein the printer management step includes a printer information change step of changing managed virtual printer information, and the color setting management step includes a color setting information change step of changing managed color setting information.

9. A non-transitory storage medium which stores a program defined in claim 5 in a computer-readable form.

10. A color print control apparatus comprising:
a color setting management unit configured to register a color profile to each of the color printers, which corresponds to paper name of paper;
a first color management unit configured to perform a color matching process for a color space data using an input profile and a reference profile; and
a second color management unit configured to perform a color matching process for the color space data performed the color matching process by the first color management unit using the reference profile and the color profile corresponding to the paper name, which is registered to each of the color printers;
wherein the plurality of color printers are clustered to print out same data.

11. The color print control apparatus according to claim 10, wherein the color space data is RGB data.

12. The color print control apparatus according to claim 10, wherein the color space data is CMYK data.

13. The color print control apparatus according to claim 10, further comprising a display unit configured to display information regarding the color profile to each of the color printers, which corresponds to the paper name of paper.

14. A color print control method for a color print control apparatus, comprising:
a color setting management step implemented by the color print control apparatus of registering a color profile to each of the color printers, which corresponds to paper name of paper;
a first color management step implemented by the color print control apparatus of performing a color matching process for a color space data using an input profile and a reference profile; and
a second color management step implemented by the color print control apparatus of performing a color matching process for the color space data performed the color matching process in the first color management step using the reference profile and the color profile corresponding to the paper name, which is registered to each of the color printers;
wherein the plurality of color printers are clustered to print out same data.

15. The color print control method according to claim 14, wherein the color space data is RGB data.

16. The color print control method according to claim 14, wherein the color space data is CMYK data.

17. The color print control method according to claim 14, further comprising a display step implemented by the color print control apparatus of displaying information regarding the color profile to each of the color printers, which is corresponds to the paper name of paper.

* * * * *